United States Statutory Invention Registration [19]

[11] Reg. Number: H782

Ono et al. [43] Published: May 1, 1990

[54] SILVER HALIDE COLOR PHOTOGRAPHIC MATERIAL

[76] Inventors: Mitsunori Ono; Koji Tamoto; Yoshisada Nakamura; Shingo Sato, all of c/o Fuji Photo Film Co., Ltd., 210, Nakanuma, Minami Ashigara-shi, Kanagawa, Japan

[21] Appl. No.: 95,714

[22] Filed: Sep. 14, 1987

[30] Foreign Application Priority Data

Sep. 12, 1986 [JP] Japan ..... 61-215256

[51] Int. Cl.[5] ..... G03C 1/08; G03C 7/26; G03C 7/32

[52] U.S. Cl. ..... 430/548; 430/549; 430/553; 430/555; 430/557; 430/558; 430/559; 430/562; 430/158

[58] Field of Search ..... 430/549, 559, 958, 553, 430/558, 562, 548, 555, 557

[56] References Cited

U.S. PATENT DOCUMENTS

| | | | |
|---|---|---|---|
| 4,248,962 | 2/1981 | Lau | 430/958 |
| 4,546,073 | 10/1985 | Bergthaller et al. | 430/558 |
| 4,585,732 | 4/1986 | Kawagishi et al. | 430/558 |
| 4,618,571 | 10/1986 | Ichijima et al. | 430/505 |
| 4,675,275 | 6/1987 | Nishijima et al. | 430/558 |
| 4,690,888 | 9/1987 | Fujiwhara et al. | 430/549 |
| 4,690,889 | 9/1987 | Saito et al. | 430/552 |
| 4,711,837 | 12/1987 | Ichijima et al. | 430/553 |

*Primary Examiner*—Matthew A. Thexton
*Assistant Examiner*—Philip Tucker

[57] ABSTRACT

A silver halide color photographic material in disclosed which comprises a support having thereon at least one silver halide emulsion layer, wherein the photographic material contains at least one compound represented by general formula (I) and at least one compound represented by general formula (II) in combination:

$$Cp—(TIME)_n—X—Dye \quad (I)$$

wherein Cp represents a coupler residue capable of releasing —(TIME)$_n$—X—Dye upon coupling with an oxidation product of an aromatic primary amine developing agent; TIME represents a timing group; n represents 0 or a positive integer; Dye represents a dye residue, and X represents an auxochromic group of said dye;

(II)

wherein R represents a hydrogen atom or a substituent; Y represents a hydrogen atom or a coupling-off group; Za, Zb and Zc each represents a methine group, a substituted methine group, =N— or —NH—; either the Za—Zb bond or the Zb–Zc bond represents a double bond and the other represents a single bond, provided that when Za, Zb or Zc represents a substituted methine group, one of the substituted methine group or R may be a divalent group capable of linking to form a dimer or higher polymer, and provided that Y does not represent —(TIME)$_n$—X—Dye as defined in general formula (I). The photographic material has improved sharpness and color reproducibility.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC MATERIAL

FIELD OF THE INVENTION

The present invention relates to a silver halide color photographic material which provides color images having excellent photographic characteristics, particularly as to sharpness and color reproducibility.

BACKGROUND OF THE INVENTION

It is known that by subjecting a silver halide color photographic material to color development, the oxidation product of an aromatic primary amine developing agent undergoes a coupling reaction with color-forming couplers to form indophenol, indoaniline, indamine, azomethine, phenoxazine and other dyes analogous thereto, whereby dye images are formed. In this type of coloring system, subtractive color photography is generally used for color reproduction, wherein silver halide emulsions selectively sensitive to blue, green and red (and yellow, magenta and cyan couplers complementary to these respective colors) are employed.

Photographic properties or characteristics of color photographic materials (such as sensitivity, graininess, sharpness, color reproducibility, etc.) or durability/fastness of color images against light or heat during storage, and the like, are generally governed by the efficacy of such couplers and dyes produced therefrom. Accordingly, various improvements have hitherto been made as to the effectiveness of such couplers to satisfy desired photographic characteristics. Currently, color image formation utilizes only dyes such as indophenol, indoaniline, indamine, azomethine, etc. as image-forming dyes formed upon a coupling reaction of such yellow, magenta or cyan couplers with the oxidation product of an aromatic primary amine developing agent However, technology in this field has already been developed to the point that tremendous improvement cannot be expected.

Couplers capable of releasing a photographically useful group (PUG) from coupler residues via a timing group upon coupling with the oxidation product of a developing agent are disclosed as novel photographic couplers in U.S. Pat. No. 4,248,962 and Japanese Patent Application (OPI) No. 56837/82 (the term "OPI" as used herein means a "published unexamined Japanese patent application"), in which photographic dyes are described as PUG, together with development inhibitors, developers, bleach inhibitors and couplers. With respect to the released PUG being photographic dyes, however, Japanese Patent Application (OPI) No. 56837/82 does not disclose this released PUG as having an effect on resulting photographic properties. Further, in U.S. Pat. No. 4,248,962, there is no disclosure as to effects on resulting photographic characteristics (such as sharpness, graininess, color reproducibility, etc.) of color images formed in color photographic materials upon using the photographic dyes as the released PUG. This is so even when using the photographic dyes as the released PUG in combination with other photographic elements in the photographic materials; however, color density is disclosed as being improved as a function of the couplers.

Couplers using photographic dyes as released PUG are also disclosed in Japanese Patent Application (OPI) No. 184541/86, which discloses that color density is improved and characteristics such as sharpness, color reproducibility, fastness to color images, etc. are improved, by selectively choosing the released photographic dyes.

Various investigations have been made using the above-referred to couplers, as well as conventionally used couplers in combination, but such photographic characteristics as color reproducibility or color image fastness are not satisfactory, and it has thus been strongly desired to improve these properties.

On the other hand, 5-pyrazolone couplers have heretofore been used as magenta color image forming couplers. Recently, improvements have been made in this field, and the pyrazolo-azole couplers as described in, for example, U.S. Pat. Nos. 4,540,654, 3,725,067, etc. have come to be used in practice.

However, when such pyrazolo-azole couplers are used as magenta color image forming couplers, color reproducibility is excellent but when they are used in combination with conventional yellow or cyan color image forming couplers, photographic characteristics of resulting color images are still unsatisfactory with respect to sharpness and color reproducibility.

SUMMARY OF THE INVENTION

Accordingly, an object of the present invention is to provide silver halide color photographic light-sensitive materials having improved sharpness and color reproducibility.

This and other objects of the present invention can be achieved by providing a silver halide color photographic light-sensitive material comprising a support having thereon at least one silver halide emulsion layer, wherein the photographic material contains at least one compound represented by general formula (I) and at least one compound represented by general formula (II) in combination:

$$\text{Cp—(TIME)}_n\text{—X—Dye} \qquad \text{(I)}$$

wherein Cp represents a coupler residue capable of releasing —(TIME)$_n$—X—Dye upon coupling with an oxidation product of an aromatic primary amine developing agent; TIME represents a timing group; n represents 0 or a positive integer; Dye represents a dye residue, and X represents an auxochromic group;

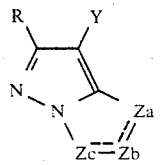

(II)

wherein R represents a hydrogen atom or a substituent; Y represents a hydrogen atom o a coupling-off group; Za, Zb and Zc each represents a methine group, a substituted methine group, =N— or —NH—; either the Za—Zb bond or the Zb—Zc bond represents a double bond and the other represents a single bond, provided that when Za, Zb or Zc represents a substituted methine group, one of the substituted methine group or R may be a divalent group capable of linking to form a dimer or higher polymer, and provided that Y does not represent —(TIME)$_n$—X—Dye as defined in general formula (I) above.

Where the coupler of general formula (I) described above is imagewise exposed in color photographic materials and then subjected to color development, the coupler reacts with the imagewise formed oxidation product of an aromatic primary amine developing agent to imagewise produce color images. The color images are composed of two dye molecules, different from each other, containing one dye molecule of the coupler represented by formula (I); the first dye is utilized in conventional color photographic materials (namely, a dye that is formed upon coupling with the oxidation product of an aromatic primary amine developing agent, such as indophenol, indoaniline, indamine, azomethine, phenoxazine, phenazine and other dyes analogous thereto); and the second dye is a new dye which is released from the coupler represented by formula (I) of the present invention at the same time that the coupling reaction occurs. Because of the properties imparted by this second dye to the resulting images, it is possible to achieve an increased density of the color images, improved color hue, improved fastness of color images, etc., in color photographic materials. Among these improved properties, the effects as to increased density of color images is remarkable.

Further, where the color image density of the first dye molecule is the same as that of the second dye molecule, approximately twice the color image density can be obtained upon reaction of one molecule of such coupler with the coupler of the present invention. The color image density can be increased to the extent that the amount of silver halide in the color photographic materials, or the amount of coupler used can be desirably reduced, whereby layer thicknesses of the color photographic materials can be produced thinner, thus resulting in marked improvement in sharpness as well. While sharpness can be improved due to the layer thickness being thinner, however, color reproducibility and fastness to color images are not as improved as could be expected, but are rather unsatisfactory for practical use in multicolor photographic light-sensitive materials.

However, as a result of extensive investigations, the present inventors have determined that using the pyrazolo-azole type magenta color image forming couplers, represented by general formula (II) described above, in combination with the dye releasing type compound represented by general formula (I) described above, it is now possible to provide silver halide color photographic light-sensitive materials having desirably improved sharpness and color reproducibility.

DETAILED DESCRIPTION OF THE INVENTION

The present invention will be described below in further detail with respect to the construction thereof, and specific but non-limiting examples as well.

First, a detailed description of the compounds represented by general formula (I) is set forth:

$$\mathrm{Cp{-}(TIME)_n{-}X{-}Dye} \qquad \text{(I)}$$

wherein Cp represents a coupler residue capable of releasing —(TIME)$_n$—X—Dye upon coupling with the oxidation product of an aromatic primary amine developing agent; TIME represents a timing group; n represents 0 or a positive integer; Dye represents a dye residue, and X represents an auxochromic group.

The coupler residue shown by Cp includes (a) residues that react with the oxidation product of an aromatic primary amine developing agent to produce a dye, and (b) residues that react with the oxidation product of an aromatic primary amine developing agent to produce a colorless substance (a so-called colorless coupler residue). Cp also includes (c) residues that contain a diffusion-resistant group therein; (d) residues that contain a non-diffusion-resistant group therein, and (e) residues that contain an alkali solubilizing group (e.g., a sulfo group, a carboxyl group) therein.

When n is 1 or greater than 1, the timing group shown by TIME represents a divalent or trivalent organic group capable of binding the coupling site of Cp with —X—Dye. When n is zero, the —X—Dye is directly bonded to the coupling site of Cp.

As the groups represented by TIME, there are, for example, the following known linkage groups:

(1) Groups utilizing the cleavage reaction of a hemiacetal:

Examples of these groups are the groups shown by formula (T-1) described in U.S. Pat. Nos. 4,146,396 and 4,652,516 and Japanese Patent Application (OPI) No. 249148/85 (corresponding to U.S. patent application Ser. No. 737,853):

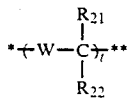

(T-1)

wherein the mark * represents a position bonding the left side of the group in formula (I); the mark ** represents a position bonding the right side of the group in formula (I); W represents an oxygen atom, a sulfur atom, or

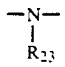

wherein $R_{23}$ represents a substituent); $R_{21}$ and $R_{22}$ each represents a hydrogen atom or a substituent; and t represents 1 or 2; when t is 2, the two $R_{21}$s and $R_{22}$s each may be the same or different and the group shown by formula (T-1) includes the case wherein two of the $R_{21}$, $R_{22}$ and $R_{23}$ combine with each other to form a cyclic structure.

Typical examples of the substituents of $R_{21}$, $R_{22}$ and $R_{23}$ are $R_{24}$—, $R_{24}CO$—, $R_{24}SO_2$—,

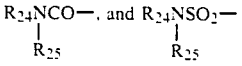

wherein $R_{24}$ represents an aliphatic group, an aromatic group, or a heterocyclic ring group, and $R_{25}$ represents a hydrogen atom, an aliphatic group, an aromatic group, or a heterocyclic ring group.

Specific examples of the group shown by formula (T-1) described above are illustrated below:

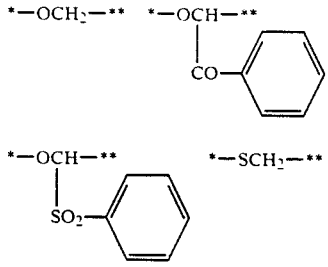

-continued

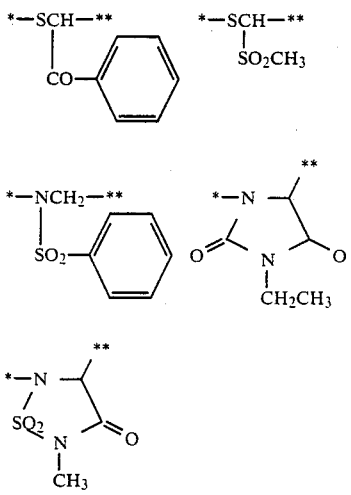

(2) Groups causing a cleavage reaction by utilizing an intramolecular nucleophilic reaction:

Examples of the groups are the timing groups described in U.S. Pat. No. 4,248,962 and are represented by formula (T-2):

$$*\text{—Nu—Link—E—}^{**} \qquad \text{(T-2)}$$

wherein the mark * represents a position bonding the left side of the group in formula (I); the mark  represents a position bonding the right side of the group in formula (I); Nu represents a nucleophilic group such as an oxygen atom and a sulfur atom; E represents an electrophilic group which can cleave the linkage to  by the nucleophilic attack from Nu; and Link represents a linkage group sterically connecting Nu and E so that they can cause an intramolecular nucleophilic reaction Specific examples of the groups shown by formula (T-2) are illustrated below.

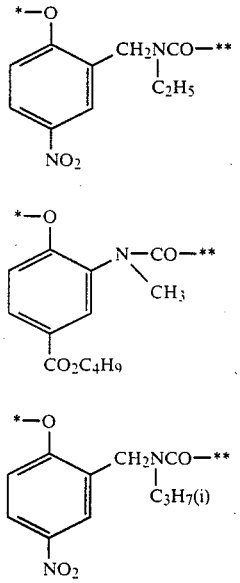

-continued

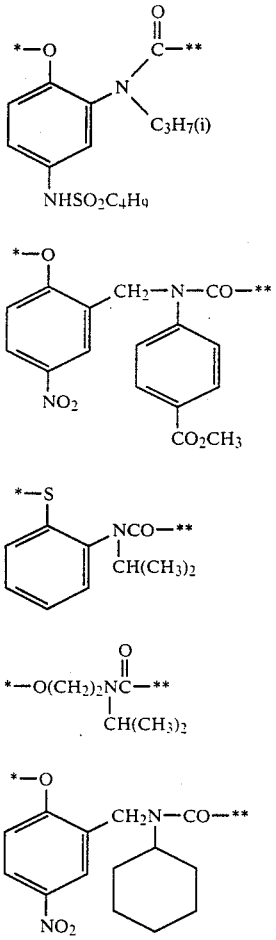

(3) Groups causing a cleavage reaction by utilizing an electron transfer reaction along the conjugated system:

Examples of the groups are described in U.S. Pat. Nos. 4,409,323 and 4,421,845 and are represented by formula (T-3):

$$*\text{—W}\left(\text{C}(R_{21})=\text{C}(R_{22})\right)_t\text{CH}_2\text{—}^{**} \qquad \text{(T-3)}$$

wherein the mark *, the mark **, W, $R_{21}$, $R_{22}$ and t have the same significance as defined above for formula (T-1).

Specific examples of the groups are illustrated below.

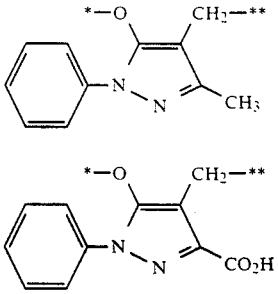

-continued

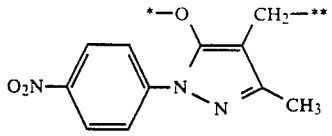

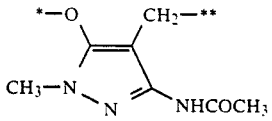

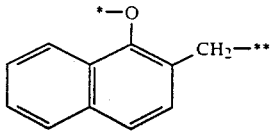

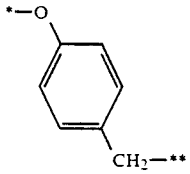

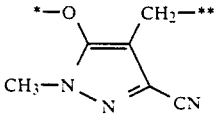

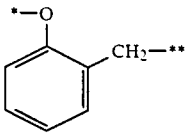

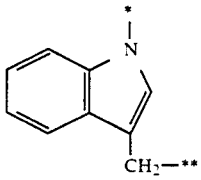

(4) Groups utilizing a cleavage reaction by the hydrolysis of an ester:

Examples of the groups are the linkage groups described in West German Patent Application (OLS) No. 2,626,315 (OLS: Offenlegunsshrift) (corresponding to British Pat. No. 1,531,927), such as those represented by formula (T-4) or (T-5):

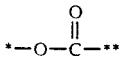

(T-4)

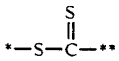

(T-5)

wherein the mark * and the mark ** have the same significance as defined above for formula (T-1).

(5) Groups utilizing the cleavage reaction of an iminoketanol:

Examples of these groups are the groups shown by formula (T-6) described in U.S. Pat. No. 4,546,073:

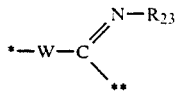

(T-6)

wherein the mark *, the mark **, $R_{23}$, and W have the same significance as defined above for formula (T-1).

Specific examples of the groups are illustrated below.

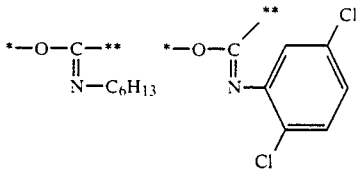

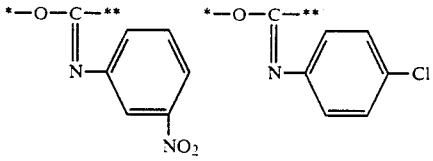

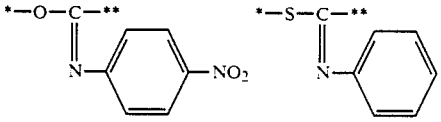

The couplers of formula (I) of the present invention may also contain the following trivalent timing groups. For example, as described in Japanese Patent Application (OPI) No. 209740/83, there are couplers wherein TIME may also be bound to the non-coupling site of Cp; thus, even after the coupling reaction with the oxidation product of an aromatic primary amine developing agent and reactions subsequent thereto, Cp and TIME have a binding ability. Further, a bond that is not cleaved even after the coupling reaction with the oxidation product of an aromatic primary amine developing agent and reactions subsequent thereto may additionally be present in the coupler, as described in Japanese Patent Application (OPI) Nos. 232549/85, 233649/85, 237446/85, 237446/85 and 237447/85. In each case described above, a bond that is not cleaved even after the coupling reaction with the oxidation product of an aromatic primary amine developing agent and reactions subsequent thereto may additionally be present between Cp and Dye. Alternatively, such a bond that is not cleaved may further be present between Cp and TIME, and between TIME and Dye in the structure of general formula (I).

Suitable auxochromic residues represented by X of general formula (I) include a hetero atom such as an oxygen atom, a nitrogen atom or a sulfur atom, etc. and an oxygen atom and a sulfur atom are preferred.

The dye residue represented by Dye is a group in which the auxochromic group is blocked with Cp or TIME to shift the maximum absorption wavelength to a shorter wavelength side.

These dyes corresponding to X-Dye of general formula (I) can be chosen from those described in, for example, J. Fabian and H. Hartman, *Light Absorption of Organic Colorants* published by Springer Verlag (1980), but are not limited thereto.

Preferred dyes are those having a pertinent color hue in such a state that the auxochromic group is dissociated.

Preferred dyes are hydroxy-substituted aromatic azo dyes or hydroxy-substituted heterocyclic aromatic azo dyes represented by the following general formula (III):

$$-X-W_1-N=N-W_2 \quad \text{(III)}$$

wherein X has the same meaning as defined in general formula (I); $W_1$ represents an atomic group which contains at least one unsaturated bond in conjugation with the azo group and connects with X on an atom forming the unsaturated bond; $W_2$ represents an atomic group which contains at least one unsaturated bond capable of conjugating with the azo group; and $W_1$ and $W_2$ contain a total of at least 10 carbon atoms.

In general formula (III), X is preferably an oxygen atom or a sulfur atom.

In general formula (III), $W_1$ and $W_2$ are preferably an aromatic group or an unsubstituted heterocyclic group. As the aromatic group, a substituted or unsubstituted phenyl group and substituted or unsubstituted naphthyl group are preferred. As the unsubstituted heterocyclic group, a 4-membered to 7-membered heterocyclic group containing a hetero atom selected from a nitrogen atom, a sulfur atom and an oxygen atom is preferred, and may also be a benzene condensed ring. Examples of the heterocyclic group include groups having a ring structure such as pyrrole, thiophene, furan, imidazole, 1,2,4-triazole oxazole, thiadiazole, pyridine, indole, benzothiophene, benzimidazole, benzoxazole, etc.

$W_1$ may have a substituent (other than X and the azo group), and examples of such a substituent include an aliphatic group, an aromatic group, an acyl group, an alkoxycarbonyl group, an aryloxycarbonyl group, an acylamino group, an alkylthio group, an arylthio group, a heterocyclic group, a sulfonyl group, a halogen atom, a nitro group, a nitroso group, a cyano group, a carboxyl group, a hydroxyl group, a sulfonamido group, an alkoxy group, an aryloxy group, an acyloxy group, a carbamoyl group, an amino group, a ureido group, a sulfamoyl group, a carbamoylsulfonyl group or a hydrazinyl group. These groups may further be substituted, if desired.

When $W_2$ represents a substituted aromatic group or a substituted unsaturated heterocyclic group, suitable substituents are those exemplified above with respect to $W_1$.

Where $W_1$ and $W_2$ contain an aliphatic moiety as the substituent, the aliphatic group may be any of a branched, a chain or a cyclic group having 1 to 32 carbon atoms, preferably 1 to 20 carbon atoms, which may be substituted or unsubstituted or, saturated or unsaturated.

Where $W_1$ and $W_2$ contain an aromatic moiety as the substituent, the aromatic group may be a group having 6 to 10 carbon atoms, preferably a substituted or unsubstituted phenyl group.

Preferred examples of the dye residues represented by general formula (III) include the following:

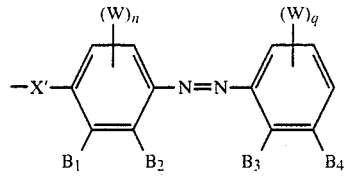
(D-1)

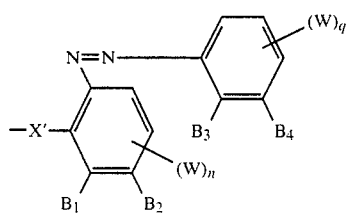
(D-2)

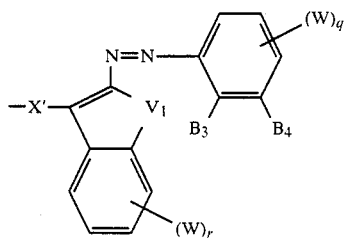
(D-3)

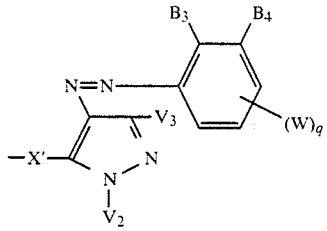
(D-4)

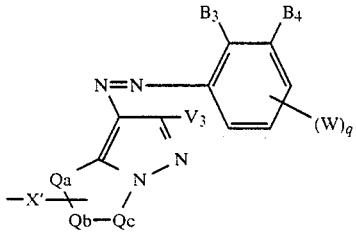
(D-5)

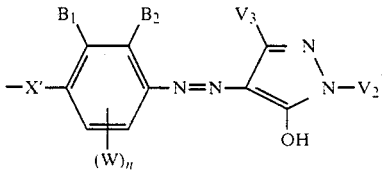
(D-6)

wherein X' represents an oxygen atom or a sulfur atom; W represents a substituent selected from those exemplified as substituents for $W_1$ and $W_2$ in general formula (III); n represents 0, 1 or 2; q represents 0, 1, 2 or 3; and r represents 0 or an integer of 1 to 4. $B_1$, $B_2$, $B_3$ and $B_4$, which may be the same or different, each represents a hydrogen atom or a substituent as defined for W; or, $B_1$ and $B_2$ or $B_3$ and $B_4$ may be combined to form a benzene condensed ring, and in this case, the benzene condensed ring may also be substituted with a substituent as defined for W.

In the above dye residues exemplified by formulae (D-1) to (D-6), when n, q or r represents an integer of 2 or more, W may be the same or different from each other.

$V_1$ represents an oxygen atom, a sulfur atom or an imino group which may have a substituent such as an aliphatic hydrocarbon residue, an aryl group or a heterocyclic residue.

$V_2$ represents an aliphatic hydrocarbon residue, an aryl group or a heterocyclic residue. When $V_2$ represents an aliphatic hydrocarbon residue, this group may be saturated or unsaturated, and straight chain, branched chain, or cyclic. Preferred examples include an alkyl group having 1 to 22 carbon atoms (for example, a methyl group, an ethyl group, an isopropyl group, a butyl group, dodecyl group, an octadecyl group, a cyclohexyl group, or the like) and an alkenyl group (for example, an allyl group, an octenyl group, etc.).

Preferred examples of the aryl group include a phenyl group, a naphthyl group, and preferred examples of the heterocyclic residue include a pyridinyl group, a quinolyl group, a thienyl group, a piperidyl group, an imidazolyl group, etc.

Suitable substituents which may be introduced into these aliphatic hydrocarbon residues, aryl groups and heterocyclic groups include those exemplified with respect to $W_1$ in general formula (III) described above.

$V_3$ represents a straight chain or branched chain alkyl group, alkenyl group, cyclic alkyl group, aralkyl group or cyclic alkenyl group having 1 to 32 carbon atoms, preferably 1 to 22 carbon atoms; an aryl group or a heterocyclic group; an alkoxycarbonyl group (for example, a methoxycarbonyl group, a stearyloxycarbonyl group, etc.), an aryloxycarbonyl group (for example, a phenoxycarbonyl group, a naphthoxycarbonyl group, etc.), an aralkyloxycarbonyl group (for example, a benzyloxycarbonyl group, etc.), an alkoxy group (for example, a methoxy group, an ethoxy group, a heptadecyloxy group, etc.), an aryloxy group (for example, a phenoxy group, a tolyloxy group, etc.), an acylamino group, (for example, an acetylamino group, a 3-{2,4-di-tert-amylphenoxy)acetamido}benzamido group, etc.), a diacylamino group, an N-alkylacylamino group (for example, an N-methylpropionamido group), an N-arylacylamino group (for example, an N-phenylacetamide group), a ureido group (for example, a ureido group, an N-arylureido group, an N-alkylureido group, etc.), an alkylamino group (for example, an n-butylamino group, a methylamino group, a cyclohexylamino group, etc.), a cycloamino group (for example, a piperidino group, a pyridino group, etc.), or a sulfonamido group (for example, an alkylsulfonamido group, an arylsulfonamido group, etc.). These groups may contain substituents, such as those exemplified above with respect to $W_1$ in general formula (III).

$V_3$ may also represent a halogen atom (for example, a chlorine atom, a bromine atom, etc.) or a cyano group.

Qa, Qb and Qc each represents a methine group, a substituted methine group, =N— or —NH—; either the Qa—Qb bond or the Qb—Qc bond represents a double bond and the other represents a single bond, provided that Qa, Qb and Qc do not all represent N at the same time. When Qb—Qc represents a carbon-carbon double bond, it may constitute a part of an aromatic ring, and this aromatic ring may also have a substituent, such as those exemplified with respect to $W_1$ described above in general formula (III).

Further, any one of Qa, Qb and Qc may bind to X' to form an —X'—C= group.

Further, a case in which the present invention particularly exhibits the desired effects is when Cp in general formula (I) represents a coupler residue shown by general formula (IV), (V), (VI), (VII), (VIII), (IX) or (X) described below. These couplers have a high coupling rate, and are thus preferred:

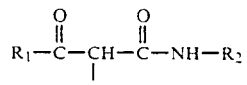
(IV)

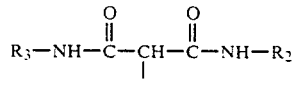
(V)

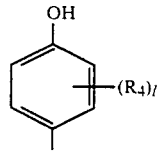
(VI)

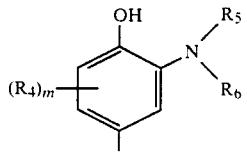
(VII)

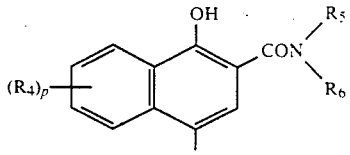
(VIII)

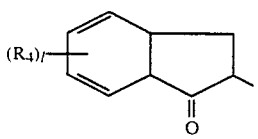
(IX)

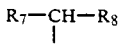
(X)

In the above formulae, a free binding position is derived from the coupling site, representing a position bonded to the coupling-off group. Further, in the above formulae (IV) to (X), when $R_1$, $R_2$, $R_3$, $R_4$, $R_5$, $R_6$, $R_7$ or $R_8$ contains a diffusion-resistant group, the group has 8 to 32 carbon atoms, preferably 10 to 22 carbon atoms, in total. In the other cases, i.e., where non-diffusion-resistant group is present, it is preferred that the total number of carbon atoms be 15 or less.

Next, $R_1$ through $R_8$, l, m, and p in general formulae (IV) through (X) shown above will be described in detail.

$R_1$ represents an aliphatic group, an aromatic group, an alkoxy group or a heterocyclic group; $R_2$ and $R_3$, which may be the same or different, each represents an aromatic group or a heterocyclic group. The aliphatic group represented by $R_1$ preferably has 1 to 22 carbon atoms, and may be substituted or unsubstituted, and chain or cyclic. Preferred examples of substituents for the aliphatic group include an alkoxy group, an aryloxy group, an amino group, an acylamino group, a halogen atom, etc. These substituents may further contain a substituent thereon. Specific examples of the aliphatic group which is useful as $R_1$ include the following: an isopropyl group, an isobutyl group, a tert-butyl group, an isoamyl group, a tert-amyl group, a 1,1-dimethylbutyl group, a 1,1-dimethylhexyl group, a 1,1-diethylhexyl group, a dodecyl group, a hexadecyl group, an octadecyl group, a cyclohexyl group, a 2-methoxyisopropyl group, a 2-phenoxyisopropyl group, a 2-p-tert-butylphenoxyisopropyl group, an α-aminoisopropyl group, an α-(diethylamino)isopropyl group, an α-(succinimido)isopropyl group, an α-(phthalimido)isopropyl group, an α-(benzenesulfonamido)isopropyl group, etc.

When $R_1$, $R_2$ or $R_3$ represents an aromatic group (especially a phenyl group), the aromatic group may be substituted with, e.g., an alkyl group, an alkenyl group, an alkoxy group, an alkoxycarbonyl group, an alkoxycarbonylamino group, an aliphatic amido group, an alkylsulfamoyl group, an alkylsulfonamido group, an alkylureido group, an alkyl-substituted succinimido group, etc., having 32 carbon atoms or less; in this case, the alkyl group substituent may be substituted with an aromatic group such as a phenylene group, etc., in the chain thereof. The aromatic group may also be substituted with an aryloxy group, an aryloxycarbonyl group, an arylcarbamoyl group, an arylamido group, an arylsulfamoyl group, an arylsulfonamido group, an arylureido group, etc., and the aryl moiety of these substituents may further be substituted with, e.g., one or more alkyl groups having 1 to 22 total carbon atoms.

The aromatic group represented by $R_1$, $R_2$ or $R_3$ may further be substituted with an amino group which may additionally be substituted with a lower alkyl group having 1 to 6 carbon atoms, a hydroxy group, a carboxyl group, a sulfo group, a nitro group, a cyano group, a thiocyano group or a halogen atom.

Furthermore, $R_1$, $R_2$ or $R_3$ may also represent a substituent in which the aromatic group is condensed with another ring, for example, a naphthyl group, a quinolyl group, an isoquinolyl group, a chromanyl group, a coumaranyl group, a tetrahydronaphthyl group, etc. These substituents may themselves additionally have one or more substituents thereon.

When $R_1$ represents an alkoxy group, the alkyl moiety may be substituted with a straight chain or branched chain alkyl group, an alkenyl group, a cyclic alkyl group or a cyclic alkenyl group, having 1 to 32 carbon atoms, preferably 1 to 22 carbon atoms, which may also be substituted with a halogen atom, an aryl group, an alkoxy group, etc.

When $R_1$, $R_2$ or $R_3$ represents a heterocyclic group, the heterocyclic group binds to the carbon atom of the carbonyl group at the acyl group, or the nitrogen atom at the amido group in the α-acylacetamido group via one of the carbon atoms for completing the ring. Examples of such hetero rings include thiophene, furan, pyrane, pyrrole, pyrazole, pyridine, pyrazine, pyrimidine, pyridazine, indolizine, imidazole, thiazole, oxazole, triazine, thiadiazine, oxazine, etc. These rings may additionally have one or more substituents thereon.

$R_4$, $R_5$ and $R_6$, which may be the same or different, each represents a group used for conventional 4-equivalent phenol or α-naphthol couplers. Specific examples of $R_4$ include a hydrogen atom, a halogen atom, an alkoxycarbonylamino group, an aliphatic hydrocarbon residue, an N-arylureido group, an acylamino group, —O—$R_9$ or —S—$R_9$ (wherein $R_9$ is an aliphatic hydrocarbon residue); where two or more $R_4$s are present in the same molecule, these $R_4$s may be different from each other, and the aliphatic hydrocarbon residue may further containing one or more substituents thereon.

Further, where these substituents contain an aryl group, the aryl group may also contain one or more substituents such as an alkyl group, an alkenyl group, a cyclic alkyl group, an aralkyl group, a cyclic alkenyl group, a halogen atom, a nitro group, a cyano group, an aryl group, an alkoxy group, an aryloxy group, a carboxyl group, an alkoxycarbonyl group, an aryloxy carbonyl group, a sulfo group, a sulfamoyl group, a carbamoyl group, an acylamino group, a diacylamino group, a ureido group, a urethane group, a sulfonamido group, a heterocyclic group, an arylsulfonyl group, an alkylsulfonyl group, an arylthio group, an alkylthio group, an alkylamino group, a dialkylamino group, an anilino group, an N-alkylanilino group, an N-arylanilino group, an N-acylanilino group, a hydroxy group, a mercapto group, etc.

$R_5$ and $R_6$ may represent an aliphatic hydrocarbon residue, an aryl group or a heterocyclic group; these groups may have one or more substituents or, either $R_5$ or $R_6$ may be a hydrogen atom. Further, $R_5$ and $R_6$ may be combined together to form a nitrogen-containing heterocyclic nucleus.

Suitable aliphatic hydrocarbon residues for $R_5$ and $R_6$ may be saturated or unsaturated, and straight chain, branched chain or cyclic. Preferred are an alkyl group (for example, a methyl group, an ethyl group, a propyl group, an isopropyl group, a butyl group, a t-butyl group, an isobutyl group, a dodecyl group, an octadecyl group, a cyclobutyl group, a cyclohexyl group or the like)and an alkenyl group (for example, an allyl group, an octenyl group or the like). Examples of the aryl group include a phenyl group, a naphthyl group, etc., and representative examples of the heterocyclic group are a pyridinyl group, a quinolyl group, a thienyl group, a piperidyl group, an imidazolyl group, etc.

Examples of suitable substituents for these aliphatic hydrocarbon residues, aryl groups and heterocyclic groups include a halogen atom, a nitro group, a hydroxy group, a carboxyl group, an amino group, a substituted amino group, a sulfo group, an alkyl group, an alkenyl group, an aryl group, a heterocyclic group, an aloxy group, an aryloxy group, an arylthio group, an arylazo group, an acylamino group, a carbamoyl group, an ester group, an acyl group, an acyloxy group, a sulfonamido group, a sulfonyl group, a sulfamoyl group, a morpholino group or the like.

l represents an integer of 1 to 4.

m represents an integer of 1 to 3.

p represents an integer of 1 to 5.

$R_7$ represents an arylcarbonyl group, an alkanoyl group having 2 to 32 carbon atoms, preferably 2 to 22 carbon atoms, an arylcarbamoyl group, an alkylcarbamoyl group having 2 to 32 carbon atoms; preferably 2 to 22 carbon atoms, an alkoxycarbonyl group having 1 to 32 carbon atoms, preferably 1 to 22 carbon atoms, or an aryloxycarbonyl group. Further, these groups may also have one or more substituents thereon, and examples of the substituents include an alkoxy group, an alkoxycarbonyl group, an acylamino group, an alkylsulfamoyl group, an alkylsulfonamido group, an alkylsuccinimido group, a halogen atom, a nitro group, a carboxyl group, a nitrile group, an alkyl group or an aryl group, etc.

$R_8$ represents an arylcarbonyl group; an alkanoyl group having 2 to 32 carbon atoms, preferably 2 to 22 carbon atoms; an arylcarbamoyl group; an alkylcarbamoyl group having 2 to 32 carbon atoms, preferably 2 to 22 carbon atoms; an alkoxycarbonyl group having 1 to 32 carbon atoms, preferably 1 to 22 carbon atoms; an aryloxycarbonyl group; an alkylsulfonyl group having 1 to 32 carbon atoms, preferably 1 to 22 carbon atoms; an arylsulfonyl group; an aryl group; a 5-membered or 6-membered heterocyclic group (which contains a hetero atom selected from a nitrogen atom, an oxygen atom and a sulfur atom and is exemplified by a triazolyl group, an imidazolyl group, a phthalimido group, a succinimido group, a furyl group, a pyridyl group or a benzotriazolyl group). These groups may additionally contain one or more substituents such as those defined for $R_7$ described above.

As has been described above, where Cp contains a diffusion-resistant group in general formula (I), after coupling with the oxidation product of an aromatic primary amine developing agent, a diffusion-resistant colored or colorless compound is formed; on the other hand, where Cp contains a non-diffusion-resistant group, the compound formed upon coupling possesses the ability to diffuse within the photographic material.

Further, where Cp contains an alkali solubilizing group, the compound formed upon coupling may dissolve out of a photographic material.

The coupler represented by general formula (I) of the present invention also includes polymeric forms. Namely, such polymers are derived from monomer couplers represented by general formula (XI) described below, have a repeating unit represented by general formula (XII), or copolymers thereof with at least one non-color forming monomer containing at least one ethylene group which is incapable of coupling with the oxidation product of an aromatic primary amine developing agent. In the present invention, two or more monomer couplers may also be copolymerized simultaneously. General formulae (XI) and (XII) are as follows:

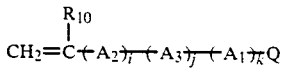

(XI)

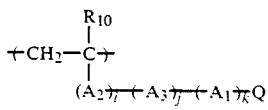

(XII)

wherein $R_{10}$ represents a hydrogen atom, a lower alkyl group having 1 to 4 carbon atoms, or a chlorine atom; $A_1$ represents —CONH—, —NHCONH—, —NHCOO—, —COO—, —$SO_2$—, —CO—, —NHCO—, —$SO_2$NH—, —NH$SO_2$—, —OCO—, —OCONH—, —NH— or —O—; $A_2$ represents —CONH— or —COO—; and $A_3$ represents an unsubstituted or substituted alkylene group having 1 to 10 carbon atoms, an unsubstituted or substituted aralkylene group or an unsubstituted or substituted arylene group, wherein the alkylene group may be straight or branched chain. Examples of the alkylene group include a methylene group, a methylmethylene group, a dimethylmethylene group, a dimethylene group, a trimethylene group, a tetramethylene group, a pentamethylene group, a hexamethylene group and a decylmethylene group; and examples of the aralkylene group include a benzylidene group, etc. Examples of the arylene group include a phenylene group, a naphthylene group, etc.

Q represents a residue represented by general formula (I) described above, and may be bonded at any suitable position on Cp, TIME and Dye.

i, j and k each represents 0 or 1, but i, j and k are not 0 simultaneously.

Examples of suitable substituents on the alkylene group, aralkylene group or arylene group represented by $A_3$ include an aryl group (for example, a phenyl group), a nitro group, a hydroxy group, a cyano group, a sulfo group, an alkoxy group (for example, a methoxy group), an aryloxy group (for example, a phenoxy group), an acyloxy group (for example, an acetoxy group), an acylamino group (for example, an acetylamino group), a sulfonamido group (for example, a methanesulfonamido group), a sulfamoyl group (for example, a methylsulfamoyl group), a halogen atom (for example, fluorine, chlorine, bromine, etc.), a carboxy group, a carbamoyl group (for example, a methylcarbamoyl group), an alkoxycarbonyl group (for example, a methoxycarbonyl group, etc.), a sulfonyl group (for example, a methylsulfonyl group) and the like. When two or more substituents are present, they may be the same or different.

Suitable non-color forming ethylenic monomers that do not couple with the oxidation product of an aromatic primary amine developing agent include acrylic acid, α-chloroacrylic acid, an α-alkylacrylic acid (for example, methacrylic acid, etc.) as well as esters or amides derived from these acrylic acids (for example, acrylamide, n-butylacrylamide, t-butylacrylamide, diacetoneacrylamide, methacrylamide, methyl acrylate, ethyl acrylate, n-propyl acrylate, n-butyl acrylate, t-butyl acrylate, iso-butyl acrylate, 2-ethylhexyl acrylate, n-octyl acrylate, lauryl acrylate, methyl methacrylate, ethyl methacrylate, n-butyl methacrylate and β-hydroxy methacrylate, etc.), methylenebisacrylamide, vinyl esters (for example, vinyl acetate, vinyl propionate and vinyl laurate), acrylonitrile, methacrylonitrile, an aromatic vinyl compound (for example, styrene and derivatives thereof, vinyltoluene, divinylbenzene, vinylacetophenone and sulfostyrene), itaconic acid, citraconic acid, crotonic acid, vinylidene chloride, vinyl alkyl ethers (for example, vinyl ethyl ether), maleic acid, maleic anhydride, maleic acid esters, N-vinyl-2-pyrrolidone, N-vinylpyridine, 2- and 4-vinylpyridine, etc. The present invention also encompasses embodiments wherein the non-color forming ethylenically unsaturated monomers are employed in combination of two or more.

The compounds represented by general formula (I) of the present invention can be synthesized according to methods described in Japanese Patent Application (OPI) Nos. 184541/86, 156047/86, 219043/86, and 255341/86, and Japanese Patent Application No. 43666/86 (corresponding to U.S. patent application Ser. No. 07/018,663, filed on Feb. 25, 1987).

Next, the couplers represented by general formula (II) will be described in detail.

The compounds represented by general formula (II) generally comprise nitrogen-containing heterocyclic couplers with two 5-membered condensed rings. The chromic nucleus thereof is of an aromatic nature, isoelectronical to naphthalene, and has a chemical structure which is generally collectively called azapentalene. Of the couplers represented by general formula (II), preferred compounds are 1H-imidazo{1,2-b}pyrazoles (which include 1H-pyrazolo{1,5-a}benzimidazoles), 1H-pyrazolo{1,5-b}pyrazoles, 1H-pyrazolo{5,1-c}{1,2,4}triazoles, 1H-pyrazolo{1,5-b} {1,2,4}triazoles, and 1H-pyrazolo{1,5-d}tetrazoles, which are represented by general formulae (XIII), (XIV), (XV), (XVI) and (XVII), respectively. Of these, particularly preferred compounds are (XIII) and (XVI):

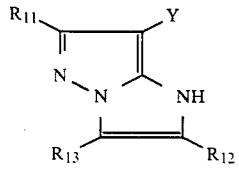
(XIII)

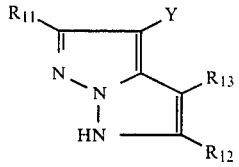
(XIV)

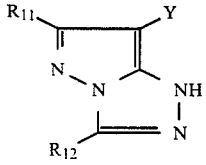
(XV)

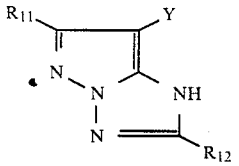
(XVI)

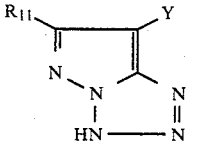
(XVII)

Examples of the substituents $R_{11}$, $R_{12}$ and $R_{13}$ in general formulae (XIII) through (XVII) include a hydrogen atom, a halogen atom, an alkyl group, an aryl group, a heterocyclic group, a cyano group, an alkoxy group, an aryloxy group, a heterocyclic oxy group, an acyloxy group, a carbamoyloxy group, a silyloxy group, a sulfonyloxy group, an acylamino group, an anilino group, a ureido group, an imido group, a sulfamoylamino group, a carbamoylamino group, an alkylthio group, an arylthio group, a heterocyclic thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group, an aryloxycarbonyl group, etc.

In general formula (XIII), $R_{12}$ and $R_{13}$ may be combined together to form a benzene ring.

$R_{11}$, $R_{12}$, $R_{13}$ or Y may also represent a divalent group capable of forming a dimer or higher polymer; this embodiment is also within the scope of the present invention. Further when the moieties represented by general formulae (XIII) through (XVII) are present in the vinyl monomer, $R_{11}$, $R_{12}$ or $R_{13}$ represents a mere bond or linking group, via which the moieties represented by general formulae (XIII) through (XVII) are bonded to the vinyl group.

More particularly, $R_{11}$, $R_{12}$ and $R_{13}$, which may be the same or different, each represents a hydrogen atom, a halogen atom (for example, a chlorine atom, a bromine atom, etc.), an alkyl group (for example, a methyl group, a propyl group, a t-butyl group, a trifluoromethyl group, a tridecyl group, a 3-(2,4-di-t-amylphenoxy)propyl group, a 2-dodecyloxyethyl group, a 3-phenoxypropyl group, a 2-hexylsulfonylethyl group, a cyclopentyl group, a benzyl group, etc.), an aryl group (for example, a phenyl group, a 4-t-butylphenyl group, a 2,4-di-t-amylphenyl group, a 4-tetradecaneamidophenyl group, etc.), a heterocyclic group (for example, a 2-furyl group, a 2-thienyl group, a 2-pyrimidinyl group, a 2-benzothiazolyl group, etc.), a cyano group, an alkoxy group (for example, a methoxy group, an ethoxy group, a 2-methoxyethoxy group, a 2-dodecyloxyethoxy group, a 2-methanesulfonylethoxy group, etc.), an aryloxy group (for example, a phenoxy group, a 2-methylphenoxy group, a 4-t-butylphenoxy group, etc.), a heterocyclic oxy group (for example, a 2-benzimidazolyloxy group, etc.), an acyloxy group (for example, an acetoxy group, a hexadecanoyloxy group, etc.), a carbamoyloxy group (for example, an N-phenylcarbamoyloxy group, an N-ethylcarbamoyloxy group, etc.), a silyloxy group (for example, a trimethylsilyloxy group, etc.), a sulfonyloxy group (for example, a dodecylsulfonyloxy group, etc.), an acylamino group (for example, an acetamido group, a benzamido group, a tetradecaneamido group, an α-(2,4-di-t-amylphenoxy)-butylamido group, a γ-(3-t-butyl-4-hydroxyphenoxy)-butylamido group, an α-{4-(4-hydroxyphenylsulfonyl)-phenoxy}decaneamido group, etc.), an anilino group (for example, a phenylamino group, a 2-chloroanilino group, a 2-chloro-5-tetradecaneamidoanilino group, a 2-chloro-5-dodecyloxycarbonylanilino group, an N-acetylanilino group, a 2-chloro-5-{α-(2-t-butyl-4-hydroxyphenoxy)dodecaneamido}anilino group, etc.), a ureido group (for example, a phenylureido group, a methylureido group, an N,N-dibutylureido group, etc.), an imido group (for example, an N-succinimido group, a 3-benzylhydantoinyl group, a 4-(2-ethylhexanoylamino)phthalimido group, etc.), a sulfamoylamino group (for example, an N,N-dipropylsulfamoylamino group, an N-methyl-N-decylsulfamoylamino group, etc.), a carbamoylamino group (for example, an N,N-dimethylcarbamoylamino group, an N-phenylcarbamoylamino group, etc.), an alkylthio group (for example, a methylthio group, an octylthio group, a tetradecylthio group, a 2-phenoxyethylthio group, a 3-phenoxypropylthio group, a 3-(4-t-butylphenoxy)propylthio group, etc.), an arylthio group (for example, a phenylthio group, a 2-butoxy-5-octylphenylthio group, a 3-pentadecylphenylthio group, a 2-carboxyphenylthio group, a 4-tetradecaneamidophenylthio group, etc.), a heterocyclic thio group (for example, a 2-benzothiazolylthio group, etc.), an alkoxycarbonylamino group (for example, a methoxycarbonylamino group, a tetradecyloxycarbonylamino group, etc.), an aryloxycarbonylamino group (for example, a phenoxycarbonylamino group, a 2,4-di-t-butylphenoxycarbonylamino group, etc.), a sulfonamido group (for example, a methanesulfonamido group, a hexadecanesulfonamido group, a benzenesulfonamido group, a p-toluenesulfonamido group, an octadecanesulfonamido group, a 2-methyloxy-5-t-butylbenzenesulfonamido group, etc.), a carbamoyl group (for example, an N-ethylcarbamoyl group, an N,N-dibutylcarbamoyl group, an N-(2-dodecyloxyethyl)carbamoyl group, an N-methyl-N-dodecylcarbamoyl group, an N-{3-(2,4-di-t-amylphenoxy)propyl}carbamoyl group, etc.), an acyl group (for example, an acetyl group, a (2,4-di-tamylphenoxy)acetyl group, a benzoyl group, etc.), a sulfamoyl group (for example, an N-ethylsulfamoyl group, an N,N-dipropylsulfamoyl group, an N-(2-dodecyloxyethyl)sulfamoyl group, an N-ethyl-N-dodecylsulfamoyl group, an N,N-diethylsulfamoyl group, etc.), a sulfonyl group (for example, a methanesulfonyl group, a octanesulfonyl group, a benzenesulfonyl group, a toluenesulfonyl group, etc.), a sulfinyl group (for example, an octanesulfinyl group, a dodecylsulfinyl group, a phenylsulfinyl group, etc.), an alkoxycarbonyl group (for example, a methoxycarbonyl group, a butyloxycarbonyl group, a dodecyloxycarbonyl group, an octadecyloxycarbonyl group, etc.), an aryloxycarbonyl group (for example, a phenyloxycarbonyl group, a 3-pentadecylphenyloxycarbonyl group, etc.), and the like.

With respect to the case in which $R_{11}$, $R_{12}$ and $R_{13}$ each represents a divalent group capable of forming a dimer or higher polymer, the divalent group is described in detail below. More specifically, the divalent group is a substituted or unsubstituted alkylene group (for example, a methylene group, an ethylene group, a 1,10-decylene group, $—CH_2CH_2—O—CH_2CH_2—$, etc.), a substituted or unsubstituted phenylene group (for example, a 1,4-phenylene group, a 1,3-phenylene group,

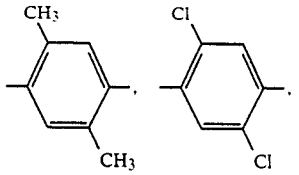

etc.), or an —NHCO—$R_{14}$—CONH— group (wherein $R_{14}$ represents a substituted or unsubstituted alkylene group or phenylene group).

Suitable linking groups represented by $R_{11}$, $R_{12}$ or $R_{13}$ (where the moieties represented by general formulae (XIII) through (XVII) are present in the vinyl monomer) include a group containing a combination of members selected from an alkylene group (which may be substituted or unsubstituted, for example, a methylene group, an ethylene group, a 1,10-decylene group, $—CH_2CH_2—I—CH_2CH_2—$, etc.), a phenylene group (which may be substituted or unsubstituted, for example, a 1,4-phenylene group, a 1,3-phenylene group,

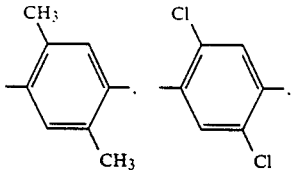

etc.), —NHCO—, —CONH—, —O—, —OCO— and an aralkylene group (for example,

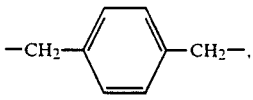

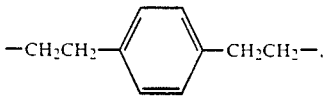

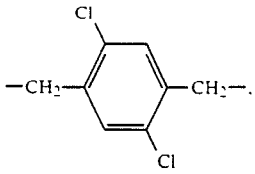

etc.).

The vinyl group in the above-described vinyl monomer also includes those having a substituent thereon, in addition to the groups represented by general formulae (XIII) to (XVII). Preferred substituents are a hydrogen atom, a chlorine atom or a lower alkyl group having 1 to 4 carbon atoms.

The non-color forming ethylenic monomers that do not couple with the oxidation product of an aromatic primary amine developing agent are the same as defined in general formulae (XI) and (XII) above.

Y in general formulae (XIII) to (XVII) is preferably a hydrogen atom, an arylthio group or an aryloxy group.

Examples of the compounds represented by general formulae (XIII) to (XVII) described above, as well as synthesis methods thereof, etc. are described in below-noted publications.

The compounds of general formula (XIII) are described in U.S. Pat. No. 4,500,630, etc.; the compounds of general formula (XIV) are described in Japanese Patent Application (OPI) No. 43659/85, *Research Disclosure,* No. 24220 (June, 1984), etc.; the compounds of general formula (XV) are described in British Pat. No. 1,247,493, etc.; the compounds of general formula (XVI) are described in U.S. Pat. Nos. 4,540,654 and 4,621,046, etc.; and the compounds of general formula (XVII) are described in Japanese Patent Application (OPI) No. 33552/85, *Research Disclosure,* No. 24220 (June, 1984), etc.

Further, ballast groups having a high color forming ability described e.g., in Japanese Patent Application (OPI) No.177553/84, and U.S. Pat. Nos. 4,443,536, 4,503,141, 4,511,649, and 4,525,450, etc., may be incorporated in any of the compounds represented by general formulae (XIII) to (XVII).

Hereafter, preferred examples of the compounds in accordance with the present invention are illustrated below, but the present invention is not deemed to be limited thereto.

(1). Examples of couplers for reconstructing yellow dyes upon cleavage of the bond between TIME (wherein n is 1 or greater than 1) or Cp (wherein n is 0) and X in general formula (I):

Y-1
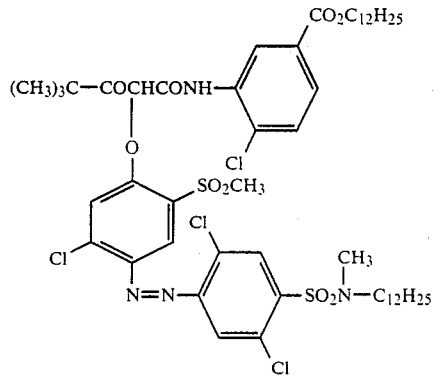
Y-2
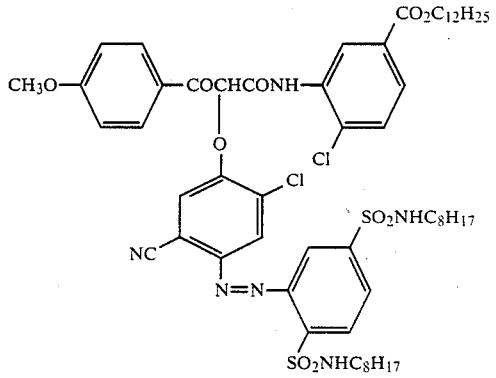
Y-3
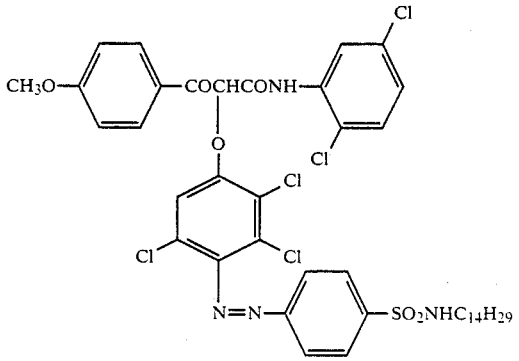
Y-4
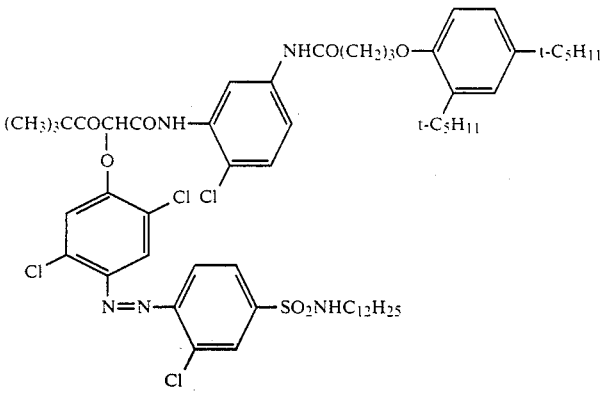

-continued
Y-5
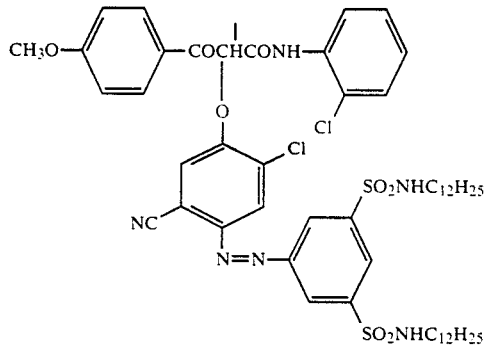
Y-6
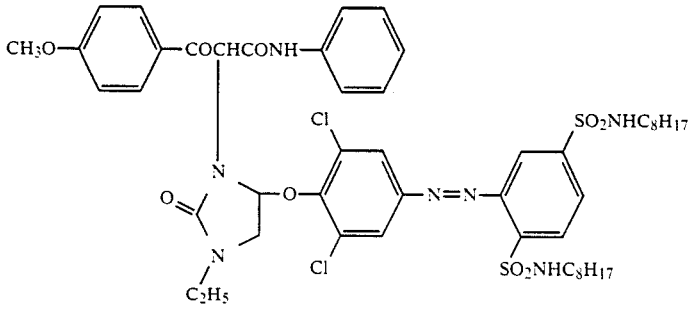
Y-7
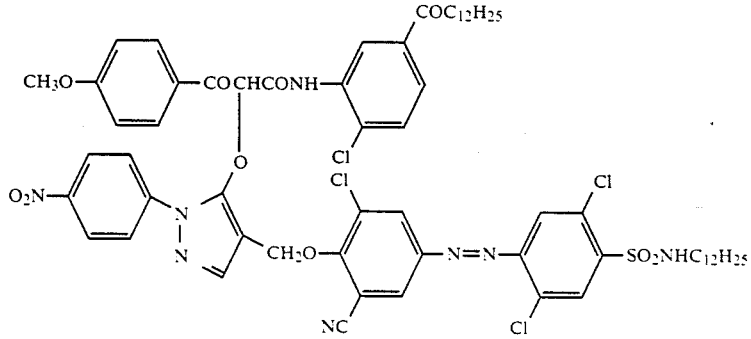
Y-8
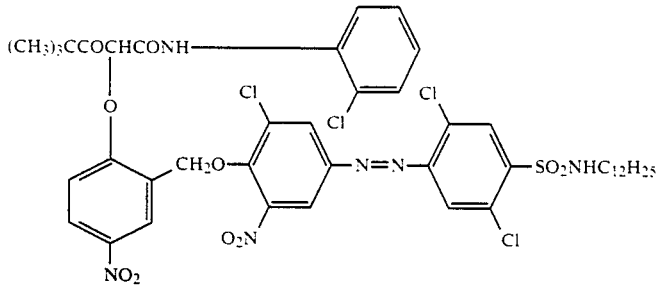

-continued
Y-9
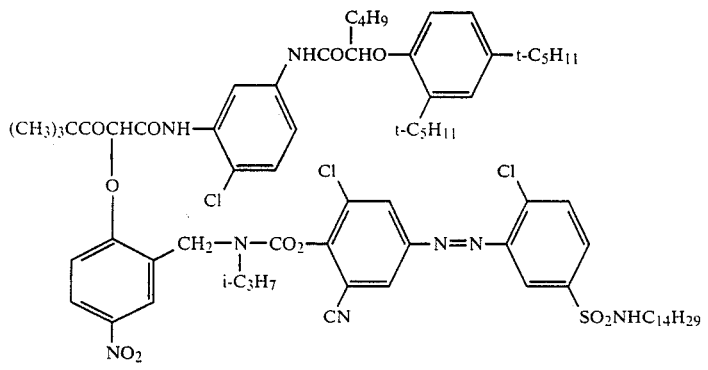
Y-10
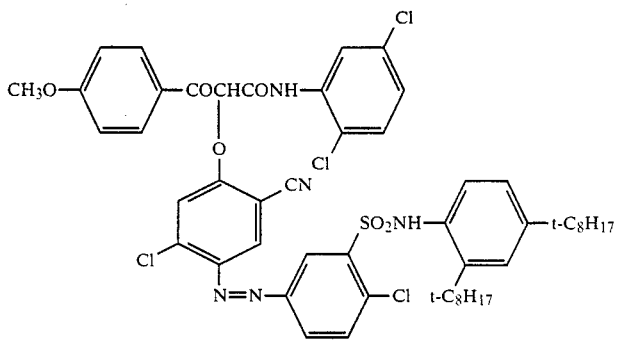
Y-11
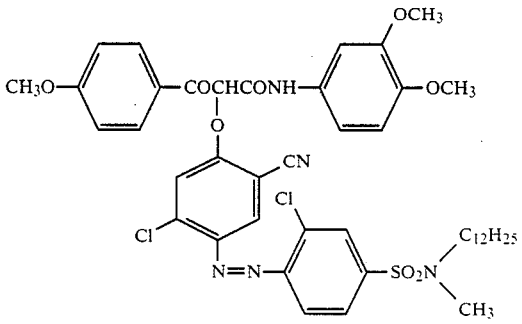
Y-12
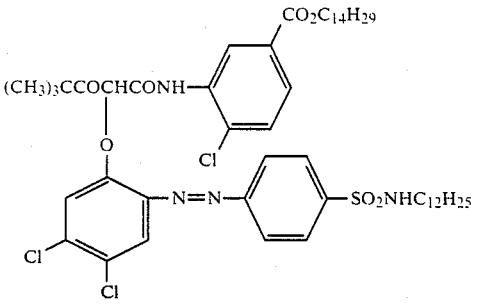

-continued
Y-13
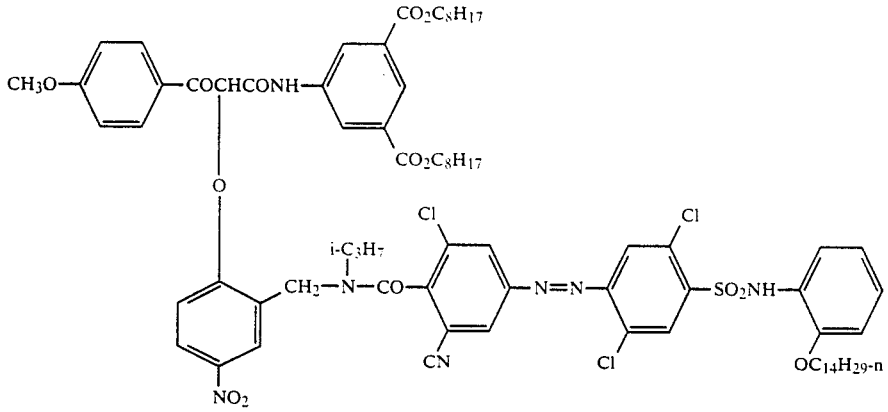
Y-14
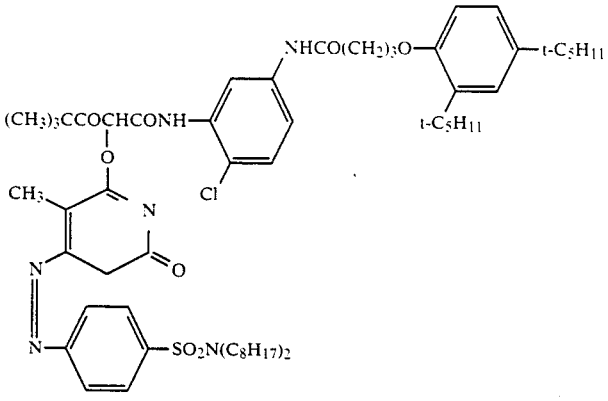
Y-15
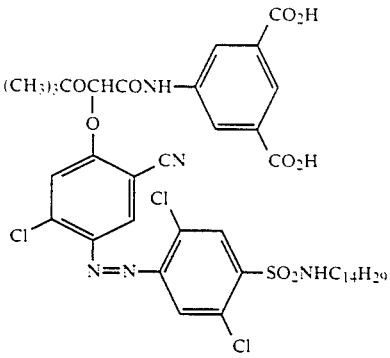

-continued
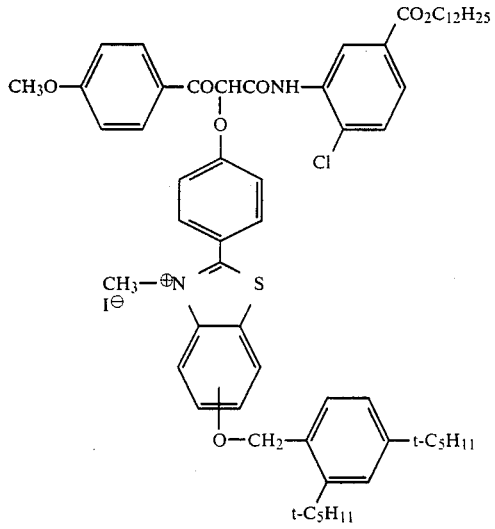
Y-16
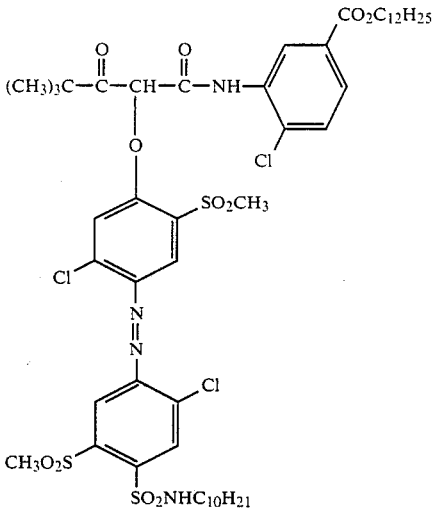
Y-17
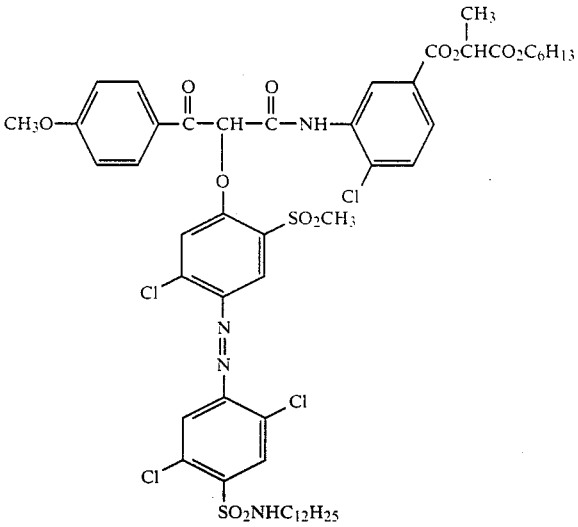
Y-18

-continued
Y-19
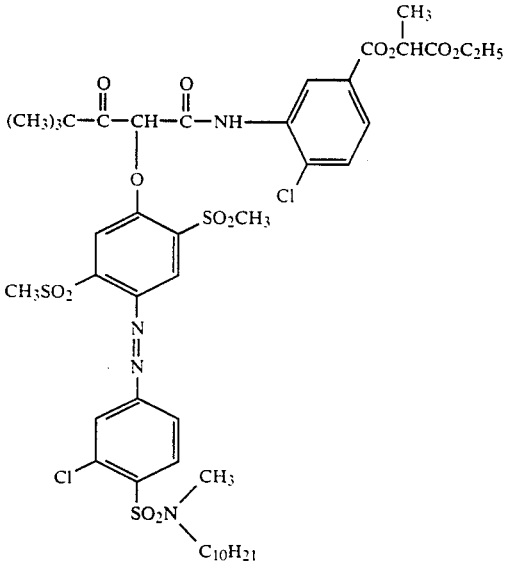
Y-20
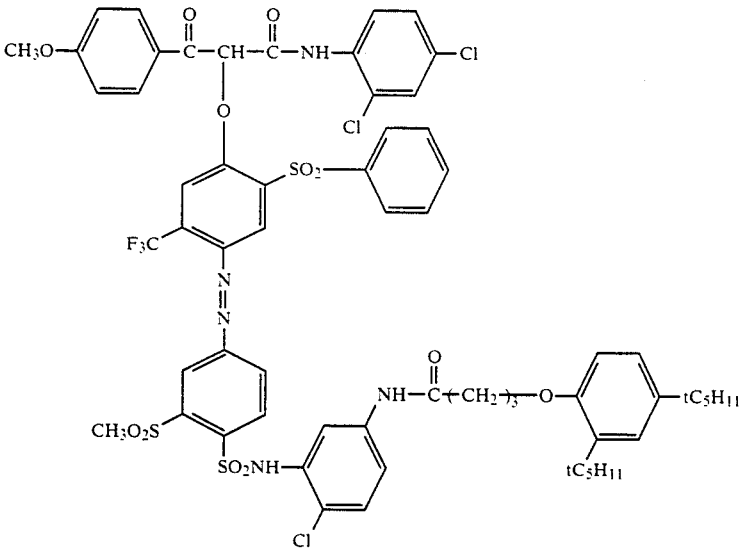
Y-21
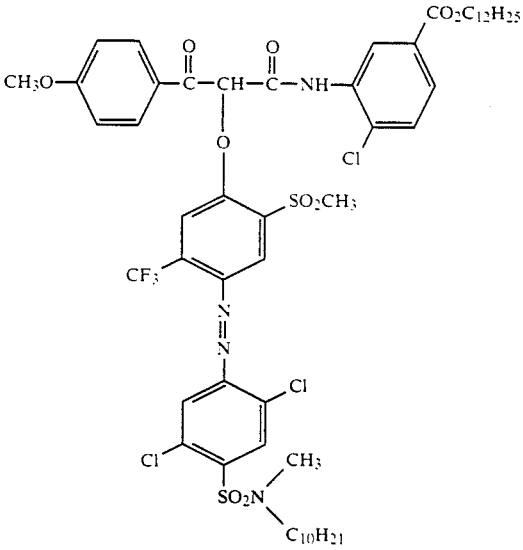

-continued
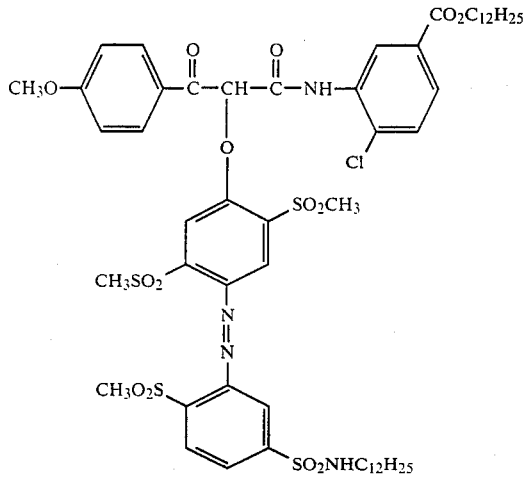
Y-22
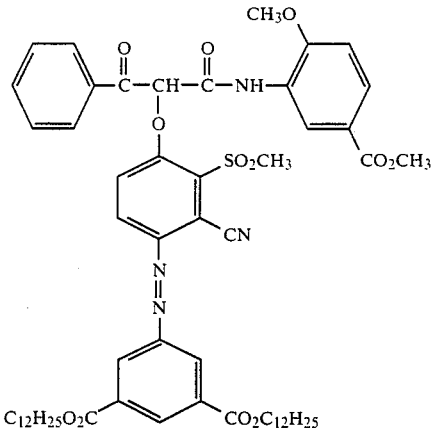
Y-23
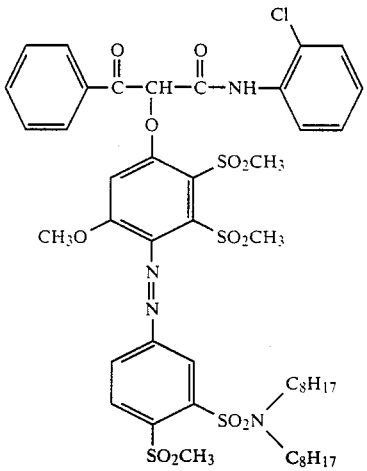
Y-24

-continued
Y-25
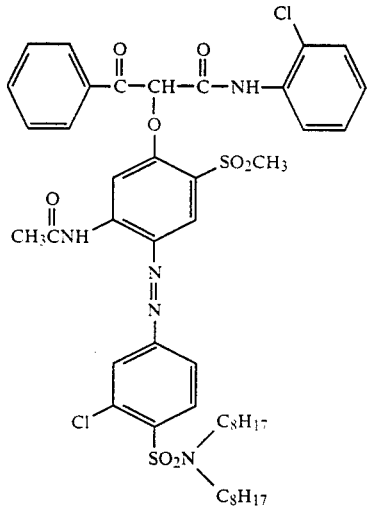
Y-26
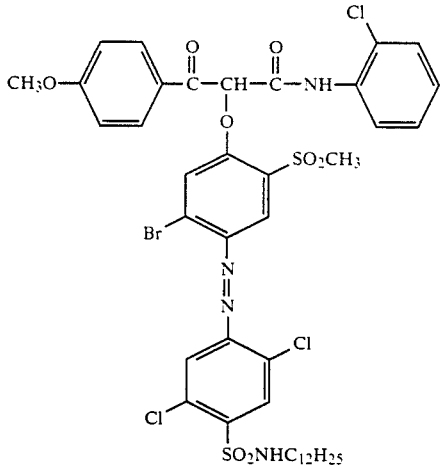
Y-27
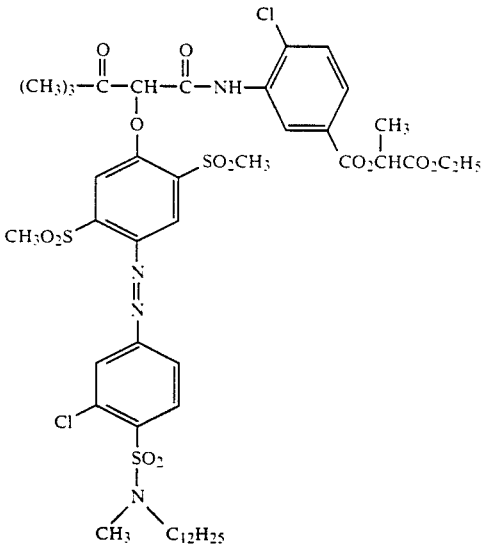

-continued
Y-28
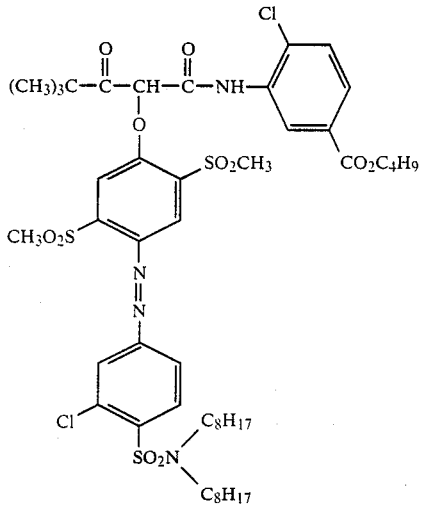
Y-29
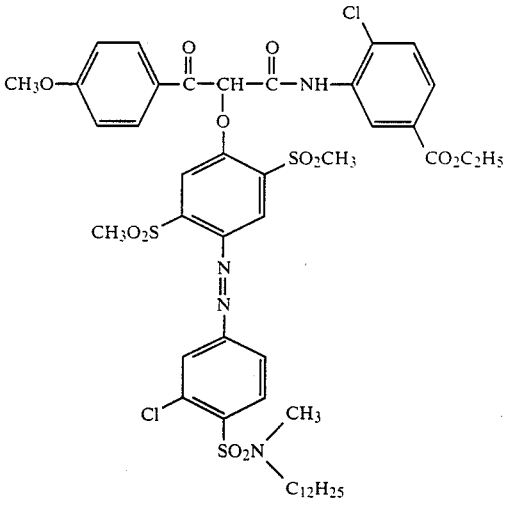
Y-30
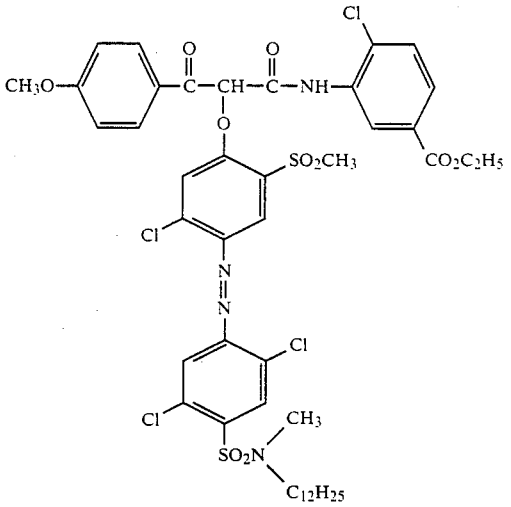

-continued
Y-31
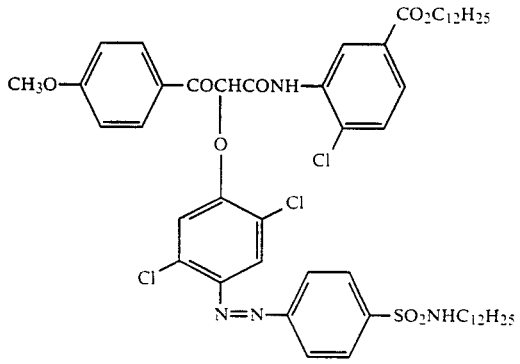
Y-32
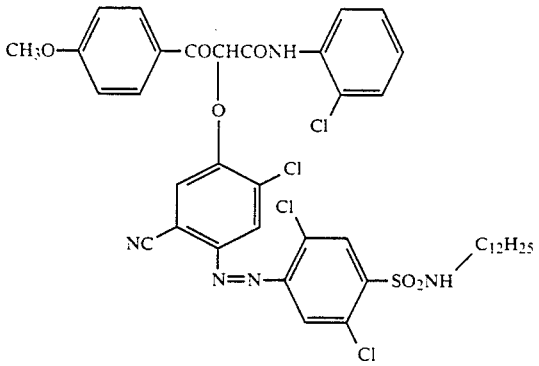
(2). Examples of couplers for reconstructing cyan dyes upon cleavage of the bond between TIME (wherein n is 1 or greater than 1) or Cp (wherein n is 0) and X in general formula (I):
C-1
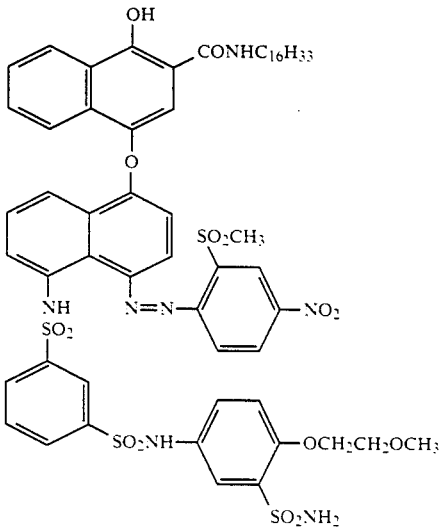

-continued
C-2
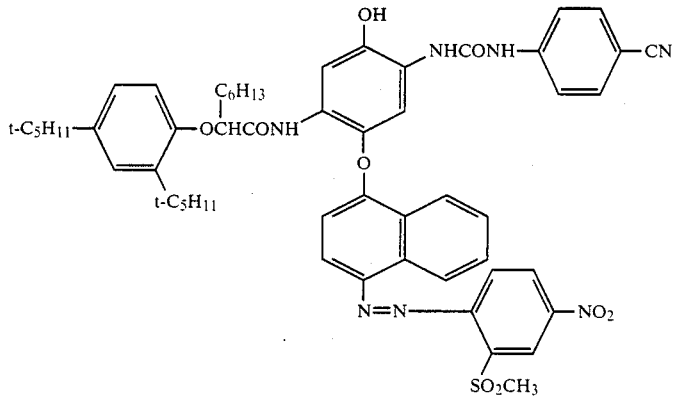
C-3
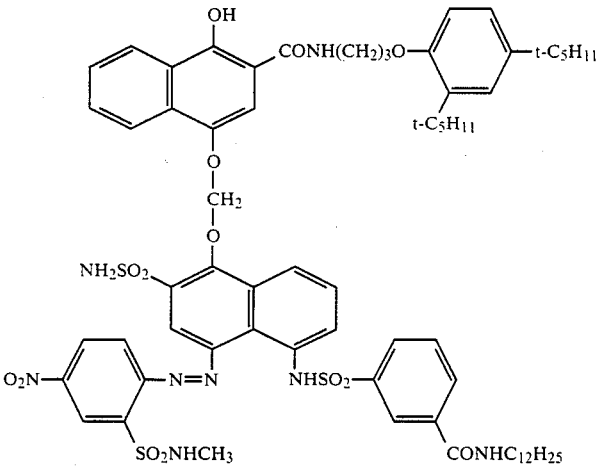
C-4
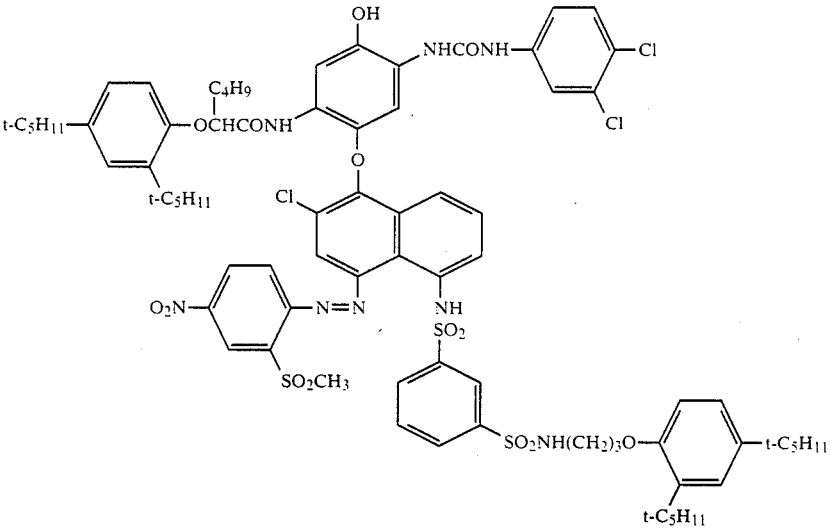

-continued
C-5
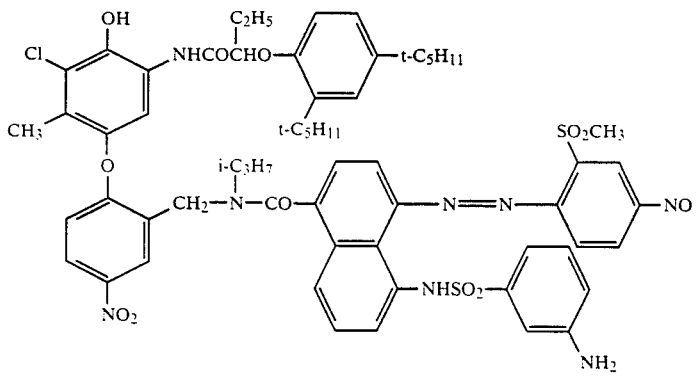
C-6
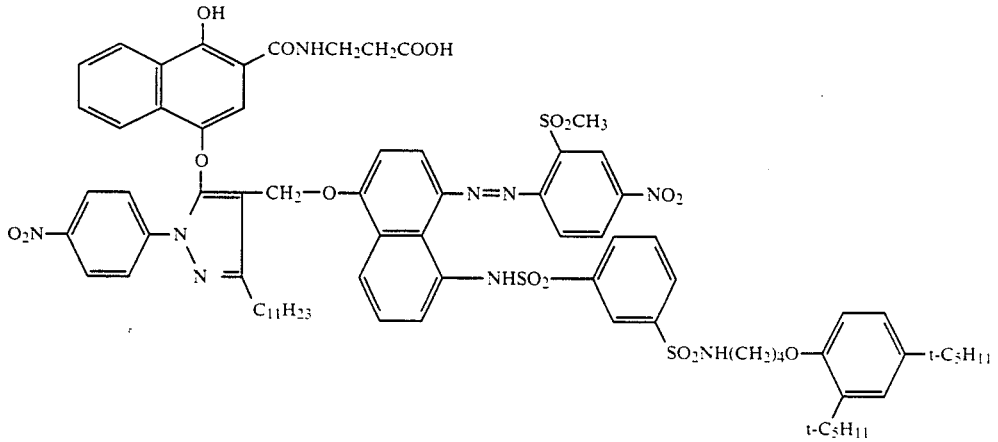
C-7
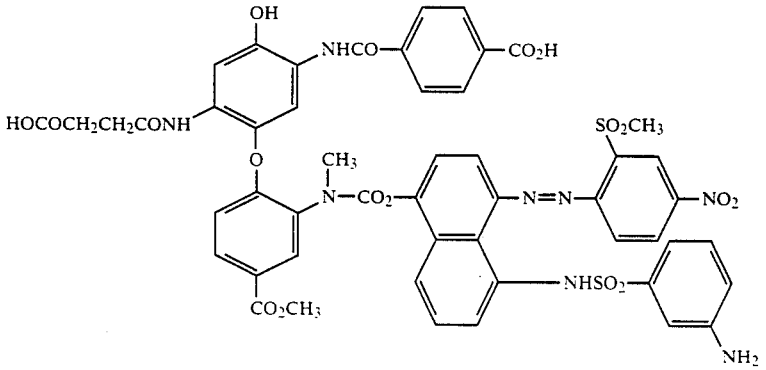
(3). Examples of couplers or coupler monomers represented by general formula (II):
M-1
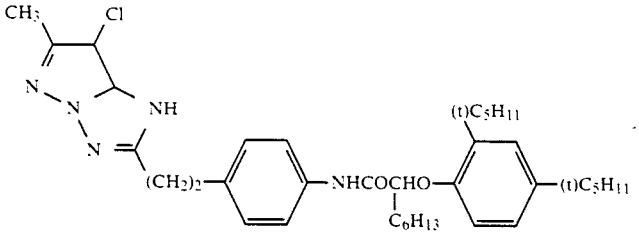

-continued
M-2
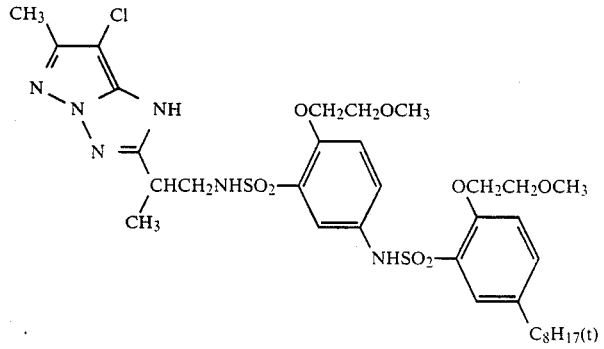
M-3
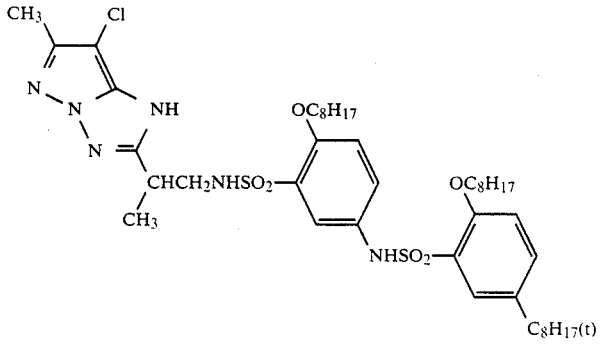
M-4
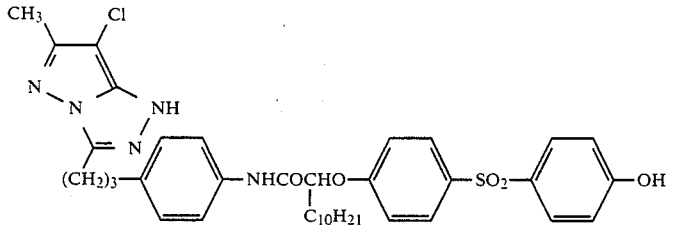
M-5
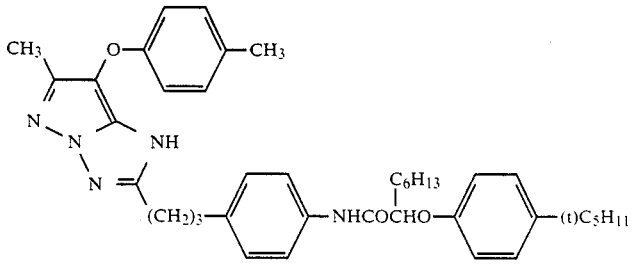
M-6
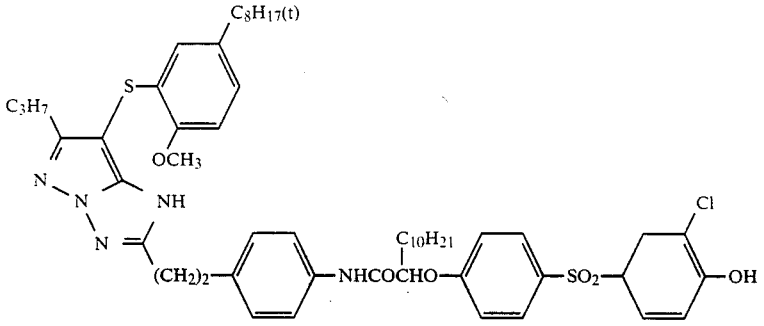

-continued
M-7
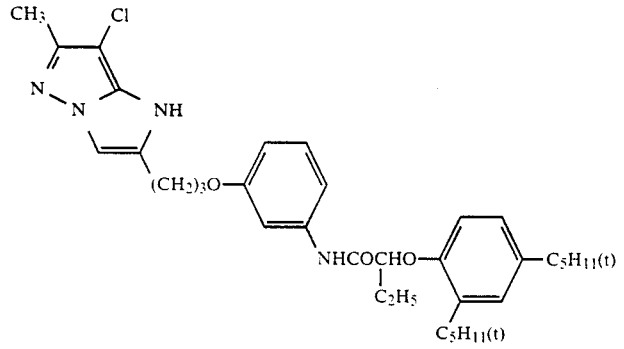
M-8
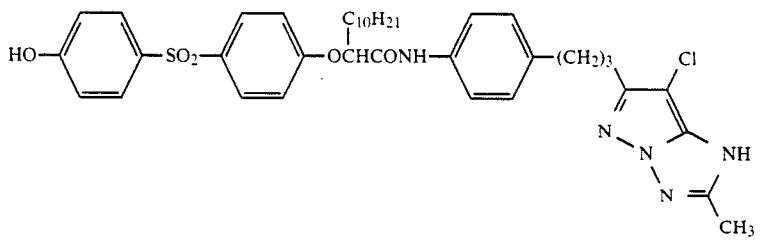
M-9
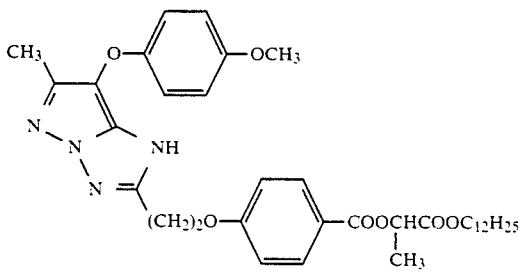
M-10
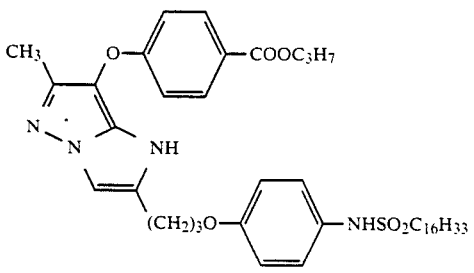
M-11
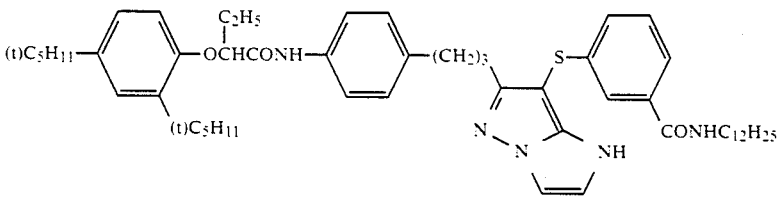
M-12
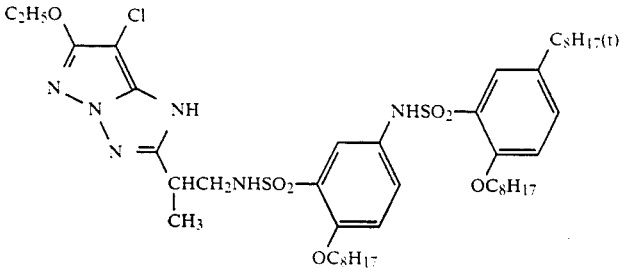

-continued
M-13
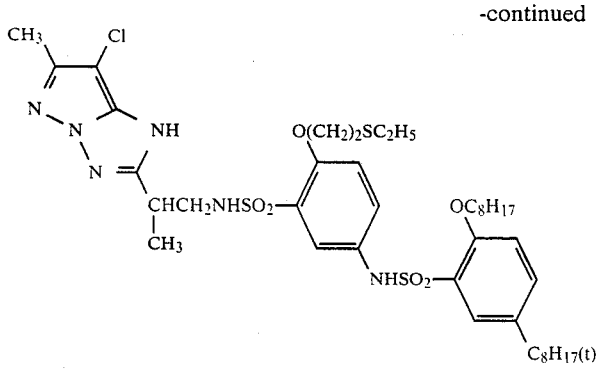
M-14
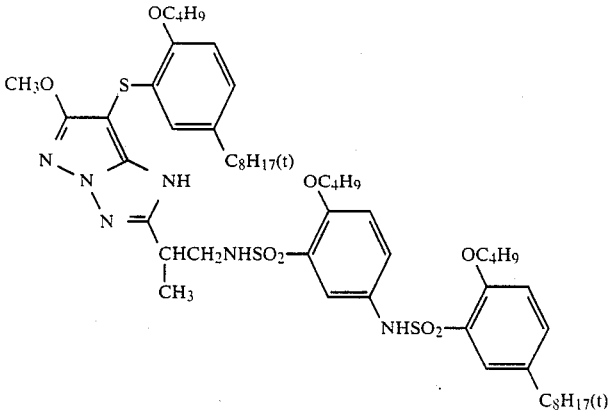
M-15
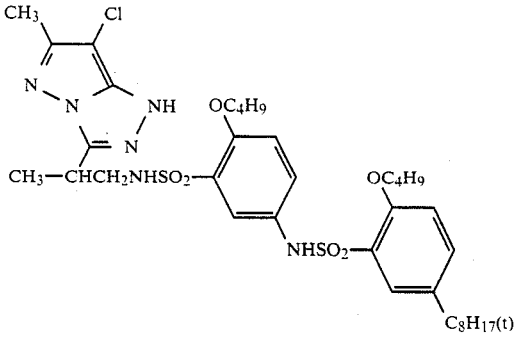
(4). Preferred examples of vinyl monomers are shown below:
M-16
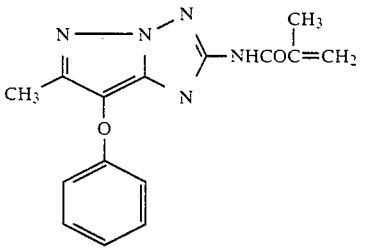
M-17
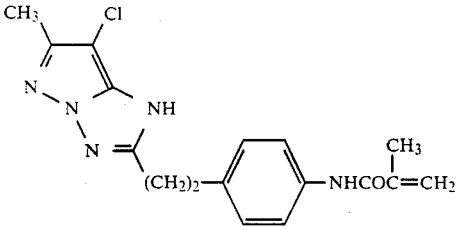
-continued
M-18
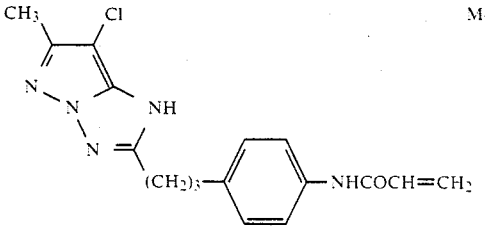
M-19
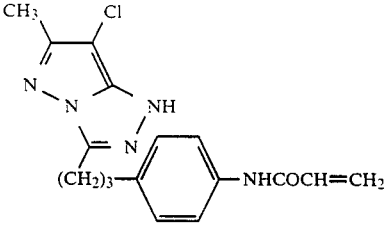

-continued

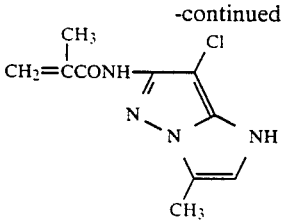

M-20

The coupler represented by general formula (I) can be incorporated in either light-sensitive layers or light-insensitive layers on a support in silver halide color photographic materials in accordance with the present invention. It is generally preferred that the coupler of general formula (I) be incorporated in a blue-sensitive emulsion layer when either a dye formed upon coupling of the nucleus of the coupler of general formula (I) of the present invention with the oxidation product of a developing agent or a dye newly released upon coupling is a yellow dye; or in a re-sensitive emulsion layer when such a dye is a cyan dye, but other combinations can also be employed without being limited to these preferred embodiments.

The amount of the coupler represented by general formula (I) used in the present invention is in a range of from about 0.005 to about 2 g/m$^2$, preferably in a range of from 0.01 to 1 g/m$^2$.

The coupler represented by general formula (II) can be incorporated in either light-sensitive layers or light-insensitive layers on a support in the silver halide color photographic materials of the present invention. It is generally preferred that the coupler of general formula (II) be incorporated in a green-sensitive emulsion layer; however, the coupler of general formula (II) can also be used in combination with other couplers by incorporation into an emulsion layer sensitive to the same colors as the couplers of general formula (I) or the other couplers, etc. which are conventionally used for color photosensitive materials; into a plurality of light-sensitive layers of the same color-sensitive emulsion layers; or into a light-insensitive layer adjacent to the layer in which the couplers of general formula (I) are contained.

The amount of the coupler represented by general formula (II) used in the present invention is in a range of from about 0.005 to about 2 g/m$^2$, preferably in a range of from 0.01 to 1 g/m$^2$.

The silver halide color photographic materials in accordance with the present invention may comprise a color photosensitive material comprising a support having provided thereon a single light-sensitive silver halide emulsion layer, or may also comprise a multilayer color photosensitive material comprising a support having provided thereon at least two light-sensitive silver halide emulsion layers having different spectral sensitivities.

The present invention is also applicable to photographic materials of such type that developed silver is also utilized as images in addition to the dyes produced from the couplers of the present invention.

Where the coupler represented by general formula (I), which newly releases a dye according to the present invention is used in the silver halide color photographic material, the coupler can be incorporated in either one or more light-sensitive layers or one or more light-insensitive layers on a support. It is generally preferred that the coupler of general formula (I) be incorporated in a blue-sensitive emulsion layer when either a dye formed upon coupling of the nucleus of the coupler of general formula (I) of the present invention with the oxidation product of a developing agent or a dye newly released upon coupling is a yellow dye; into a green-sensitive emulsion layer when it is a magenta dye, and into a red-sensitive emulsion layer when it is a cyan dye.

Polymer mordants containing secondary amine, tertiary amine or quaternary amine compounds, as described in Japanese Patent Application (OPI) No. 156047/86, or containing such amines as repeating units, can also be incorporated in the same layer(s) as containing the couplers of general formula (I), or a layer adjacent thereto.

In general, multilayered multicolor photographic materials comprise a support having provided thereon at least one red-sensitive emulsion layer, at least one green-sensitive emulsion layer and at least one blue-sensitive emulsion layer. The order of these light-sensitive layers is not particularly limited, and can be selected as required. Generally, the red-sensitive emulsion layer contains a cyan forming coupler, the green-sensitive emulsion layer contains a magenta forming coupler and the blue-sensitive emulsion layer contains a yellow forming coupler, but in some cases, other combinations are possible.

The photographic emulsion layer(s) used in the photographic materials of the present invention may use as a silver halide any one of silver iodobromide, silver iodochloride or silver iodochlorobromide containing up to about 30% by mol of silver iodide. A particularly preferred silver halide is silver iodobromide containing about 2 to about 25% by mol of silver iodide.

The silver halide grains in the photographic emulsion may be regular crystals, for example, in a cubic, octahedral or tetradecahedral shape, or irregular crystals, for example, in a spherical or tabular shape, or in a defective crystal shape, for example, twin crystals or crystals comprising a combination of these shapes.

The silver halide grains may be fine grains having an average grain size of about 0.1 μm or less, or larger grains up to about 10 μm in terms of the diameter based on the projected area of the grains. The silver halide emulsion may be either monodispersed or multidispersed.

Silver halide photographic emulsion(s) which can be used in the present invention can be manufactured according to the methods disclosed in, for example, *Research Disclosure* (*RD*), No. 17643 (December, 1978), pages 22 and 23, "I. Emulsion Preparation and Types" and *Research Disclosure* (*RD*), No. 18716 (November, 1979), page 648; P. Glafkides: *Chimie et Photographique*, Paul Montel, Paris (1967); G. F. Duffin, *Photographic Emulsion Chemistry;* Focal Press, (1966); V. L. Zelikman et al, *Making and Coating Photographic Emulsion*, Focal Press, (1964); etc. Monodispersed emulsions describe in U.S. Pat. Nos. 3,574,628 and 3,655,394, British Pat. No. 1,413,748, etc. are also preferred.

In addition, tabular silver halide grains having an aspect ratio of about 5 or greater may also be used in the present invention. The tabular grains can be readily manufactured by the methods disclosed in, for example, Gutoff, *Photographic Science and Engineering*, Vol. 14, pages 248 to 257 (1970); U.S. Pat. Nos. 4,434,226, 4,414,310, 4,433,048 and 4,439,520, British Pat. No. 2,112,157, etc.

The crystalline structure of the silver halides may be uniform, or may comprise different halogen compositions at the inner and outer portions, or may be of a layered structure. Further, silver halides having a different composition may also be conjugated by epitaxial conjunction. Furthermore, the silver halide may also be conjugated with compounds other than silver halide, for example, silver rhodanate, lead oxide, etc.

Moreover, the silver halide grains may be mixtures of crystals of these various shapes and structures.

The silver halide emulsions used in the present invention are generally physically ripened, chemically ripened and spectrally sensitized. The specific details of these conventional steps are disclosed in *Research Disclosure,* Nos. 17643 and 18716, and the relevant portions are summarized in the table below.

Various known photographic additives which can be used in the present invention are also disclosed in the above *Research Disclosure* publications, (incorporated herein by reference) as illustrated below, and are applicable to the present invention as well.

| Example of Photographic Additive | RD No. 17643 Page | RD No. 18716 Page |
|---|---|---|
| 1. Chemical sensitizers | 23 | 648 right column |
| 2. Sensitivity increasing agents | — | " |
| 3. Spectral sensitizers and supersensitizers | 23–24 | 648 right column to 649 right column |
| 4. Whitening agents | 24 | — |
| 5. Antifoggants and stabilizers | 24–25 | 649 right column |
| 6. Light-absorbing agents, filter dyes, and ultra-violet absorbers | 25–26 | 649 right column to 650 right column |
| 7. Antistain agents | 25 right column | 650 left to right column |
| 8. Dye image stabilizers | 25 | — |
| 9. Hardeners | 26 | 651 left column |
| 10. Binding agents | 26 | " |
| 11. Plasticizers and lubricants | 27 | 650 right column |
| 12. Coating aids and surfactants | 26–27 | " |
| 13. Antistatic agents | 27 | " |

Various color couplers can also be used in the present invention, and specific examples thereof are described in the patents referred to in *Research Disclosure* (*RD*), No. 17643, VII-C to G, supra.

Preferred yellow couplers are those described in, for example, U.S. Pat. Nos. 3,933,501, 4,022,620, 4,326,024, and 4,401,752, Japanese Patent Application (OPI) No. 10739/83, British Pat. Nos. 1,425,020 and 1,476,760, etc.

Preferred magenta couplers include 5-pyrazolone type and pyrazolo-azole type compounds. Particularly preferred are those described in U.S. Pat. Nos. 4,310,619 and 4,351,897, European Pat. No. 73,636, U.S. Pat. Nos. 3,061,432 and 3,725,067, *Research Disclosure,* No. 24220 (June, 1984), Japanese Patent Application (OPI) No. 33552/85, *Research Disclosure,* No. 24230 (June, 1984), Japanese Patent Application (OPI) No. 43659/85, U.S. Pat. Nos. 4,500,630, and 4,540,654, etc.

Suitable cyan couplers include phenol type and naphthol type couplers. Particularly preferred are those described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011 and 4,327,173, West German Patent Application (OLS) No. 3,329,729, European Pat. No. 121,365A, U.S. Pat. Nos. 3,446,622, 4,333,999, 4,451,559 and 4,427,767, European Pat. No. 161,626A, etc.

As the cyan couplers, naphthol type couplers containing an amido group in the 5-position as described in European Patent Application No. 161,626A, phenol type couplers containing a phenylureido group in the 2-position and an acylamino group in the 5-position as described in U.S. Pat. Nos. 3,446,622, 4,333,999, 4,451,559, and 4,427,767, and naphthol type couplers containing a carbamoyl group in the 2-position as described in U.S. Pat. Nos. 4,254,212, 4,296,199, and 3,488,193, British Pat. No. 914,507, and Japanese Patent Publication No. 3 /79 are more preferred.

Specific examples of the cyan couplers which can be used in the present invention are given below, but the present invention should not be construed as being limited thereto.

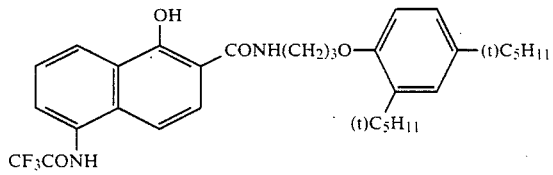

(a-1)

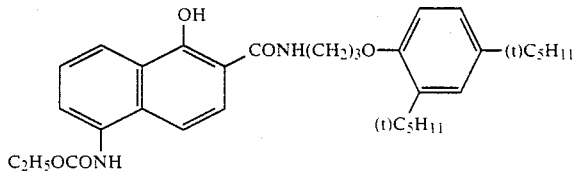

(a-2)

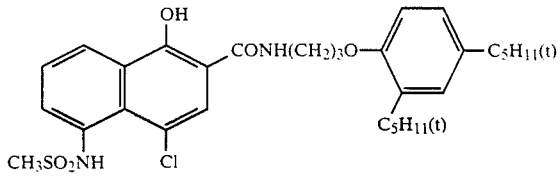

(a-3)

-continued
(a-4)
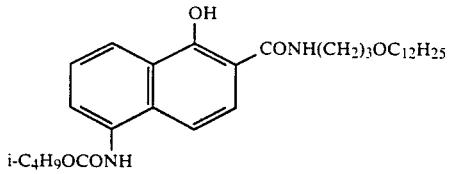
(a-5)
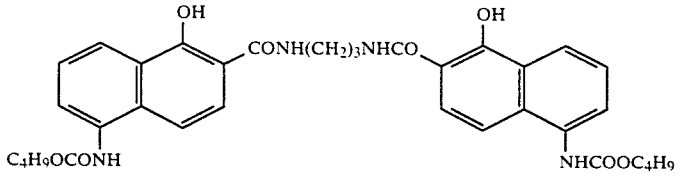
(a-6)
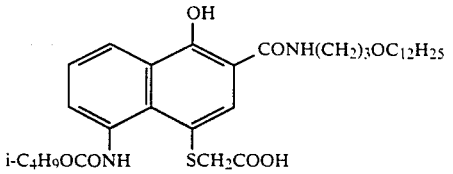
(a-7)
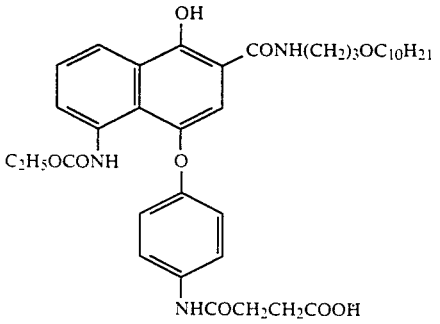
(a-8)
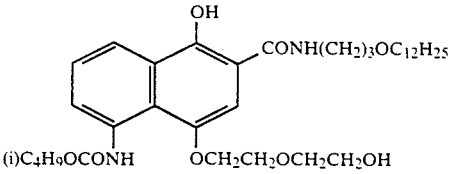
(a-9)
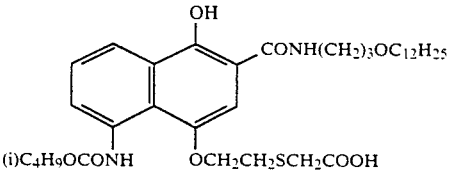
(a-10)
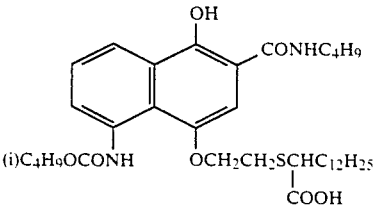
(a-11)
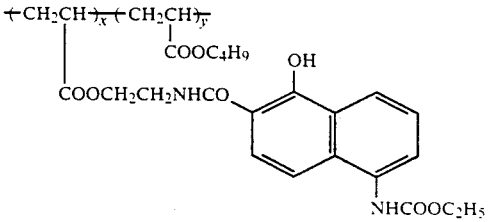

-continued
x:y = 60:40 (by weight)
(a-12)
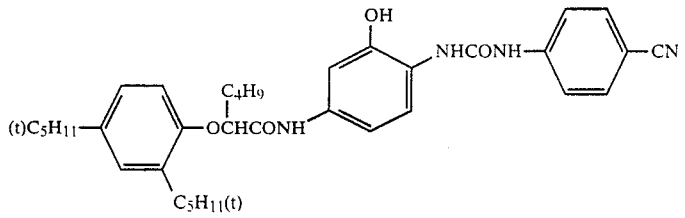
(a-13)
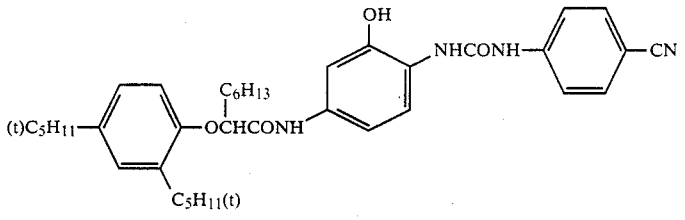
(a-14)
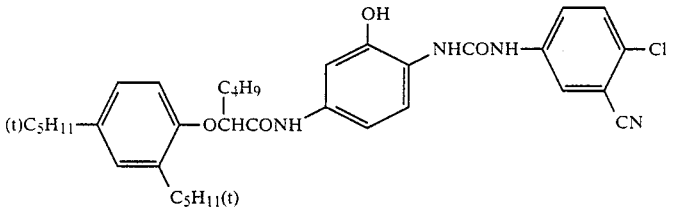
(a-15)
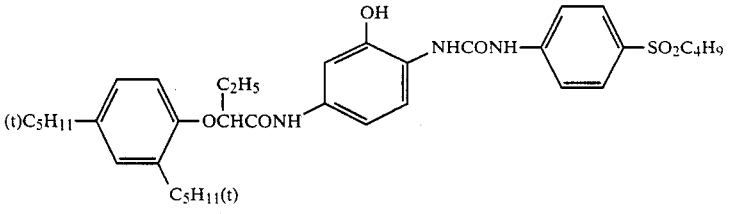
(a-16)
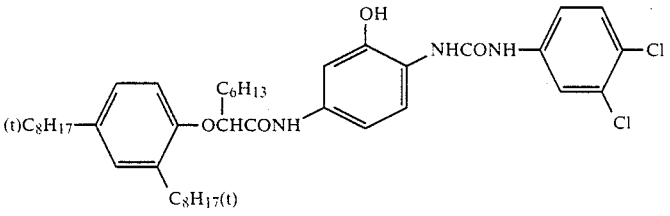
(a-17)
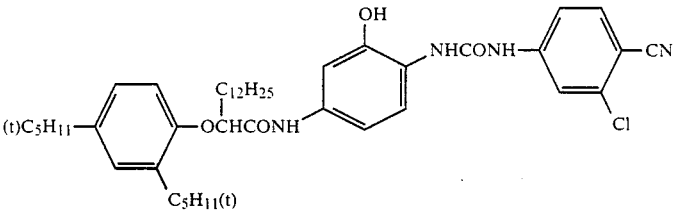

-continued
(a-18)
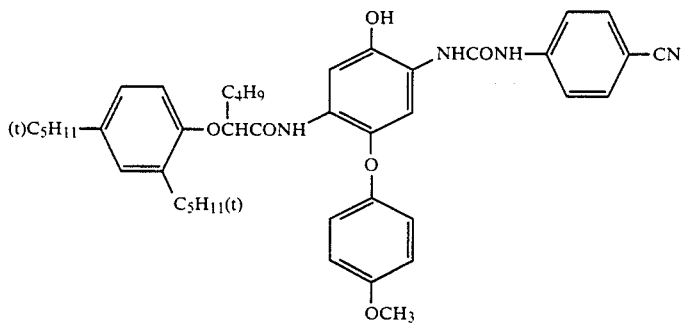
(a-19)
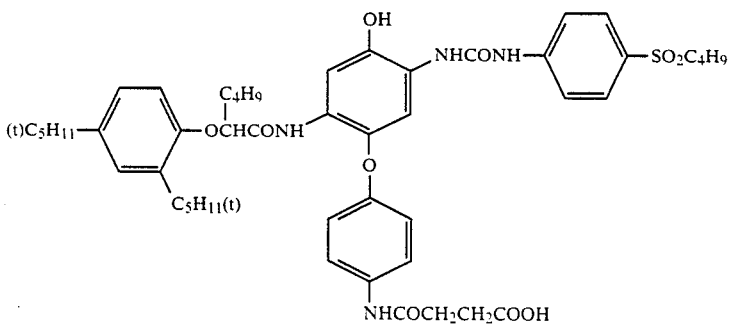
(a-20)
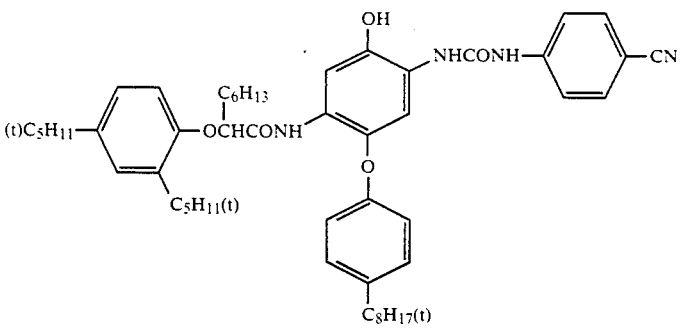
(a-21)
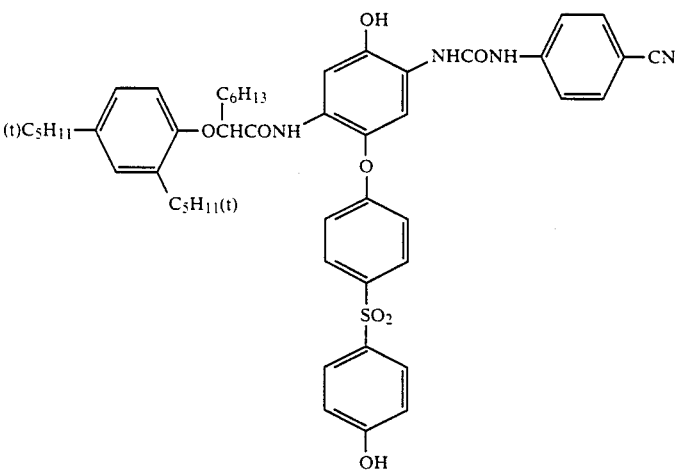

-continued
(a-22)
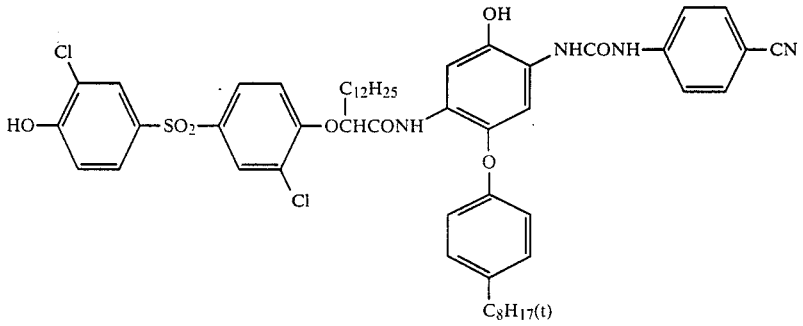
(a-23)
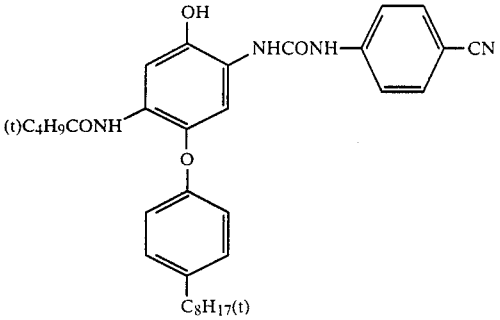
(a-24)
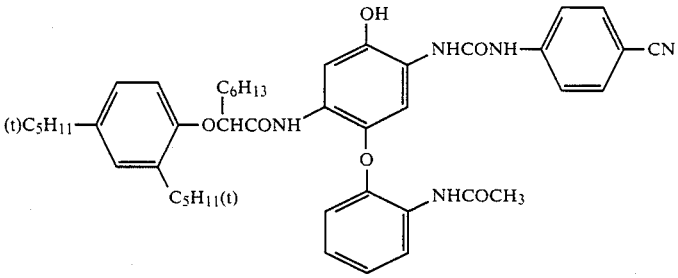
(a-25)
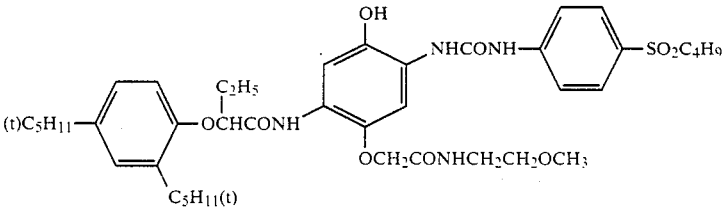
(a-26)
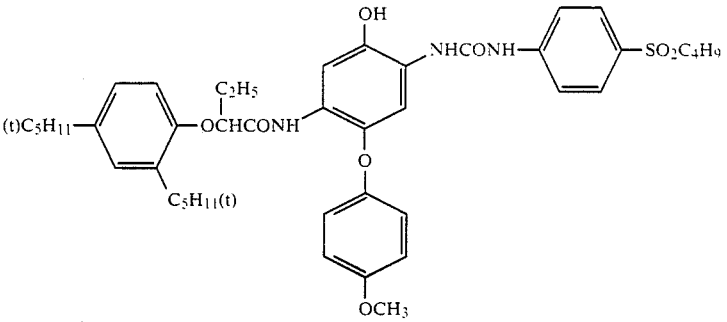

-continued
(a-27)
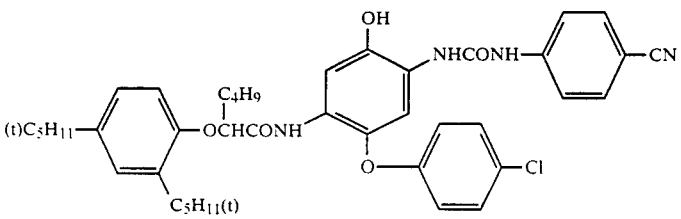
(a-28)
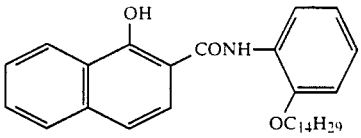
(a-29)
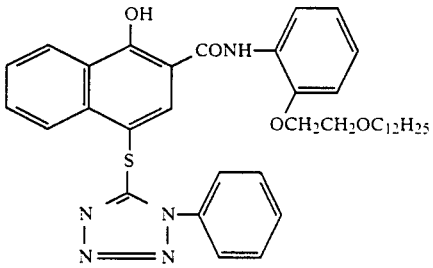
(a-30)
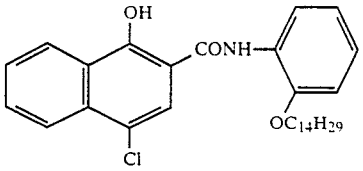
(a-31)
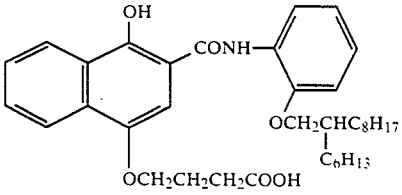
(a-32)
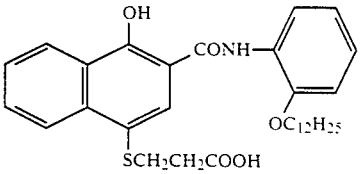
(a-33)
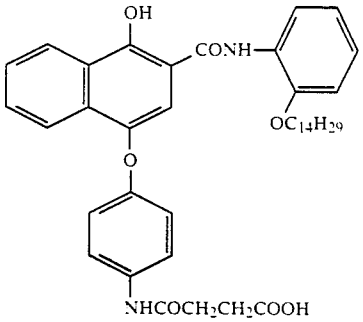

-continued (a-34)

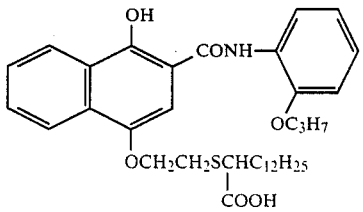

(a-35)

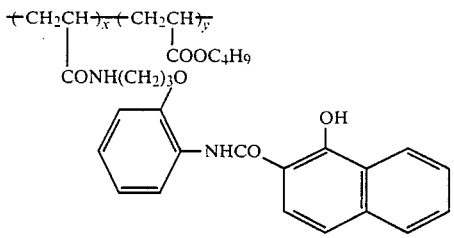

x:y = 70:30 (by weight)

Suitable colored couplers for correcting unnecessary absorption of colored dyes are preferably those described in *Research Disclosure,* No. 17643, VII-G, U.S. Pat. No. 4,163,670, Japanese Patent Application (OPI) No. 39413/82, U.S. Pat. Nos. 4,004,929 and 4,138,258, British Pat. No. 1,146,368.

Couplers which provide diffusible colored dyes preferably include those described in U.S. Pat. No. 4,366,237, British Pat. No. 2,I25,570, European Pat. No. 96,570, West German Patent Application (OLS) No. 3,234,533.

Typical examples of polymerized dye-forming couplers are described in U.S. Pat. Nos. 3,451,820, 4,080,211 and 4,367,282, British Pat. No. 2,102,173, etc.

Couplers which can release a photographically useful group upon coupling can also be preferably used in the present invention. Preferred DIR couplers which release a development inhibitor include those described in the patents referred to in *Research Disclosure,* No. 17643, VII-F, supra; Japanese Patent Application (OPI) Nos. 151944/82, 154234/82 and 184248/85, and U.S. Pat. No. 4,248,962.

Couplers which imagewise release nucleating agents or development accelerators preferably include those described in British Pat. Nos. 2,097,140 and 2,131,188, Japanese Patent Application (OPI) Nos. 157638/84 and 170840/84.

Other suitable couplers that can be used in the photographic materials of the present invention include competing-type couplers described in U.S. Pat. No. 4,130,427, etc.; multi-equivalent couplers described in U.S. Pat. Nos. 4,283,472, 4,338,393 and 4,310,618, etc; etc.

In the photographic material of the present invention, the couplers represented by the following general formula (XVIII) described in U.S. Pat. No. 4,618,571;

A—RED—PUG (XVIII)

wherein A represents a coupler residue which releases the RED-PUG group upon the coupling reaction with the oxidation product of a developing agent; RED represents a group which releases the PUG group after the oxidation-reduction reaction with the oxidation product of a developing agent after the bonding to A is cleaved selected from the group consisting of a hydroquinone, a catechol, a naphthohydroquinone, an o-amino or p-amino phenol or a bisphenol; and PUG represents a group which exerts a substantial photographic function after the bonding to RED is cleaved; are preferably incorporated.

Specific examples of the couplers are given below, but the present invention should not be construed as being limited thereto.

(1)

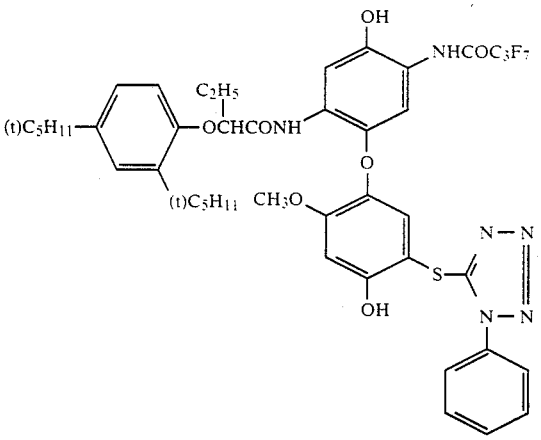

-continued
(2)
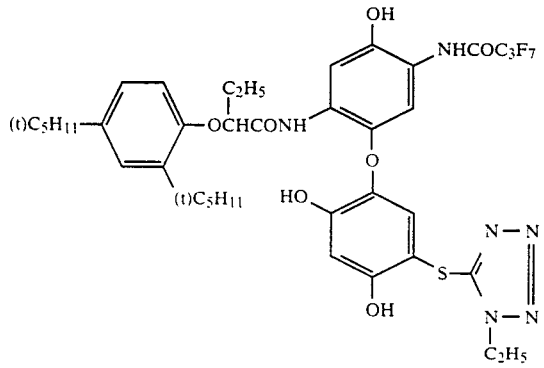
(3)
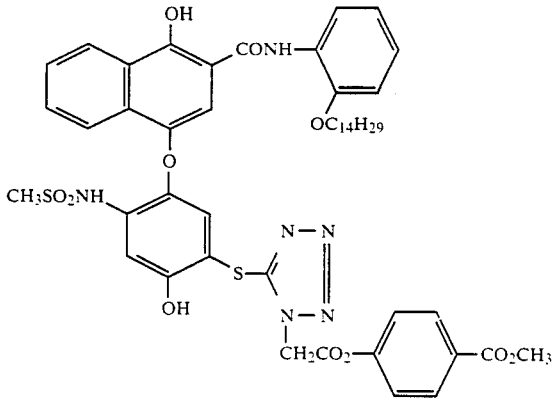
(4)
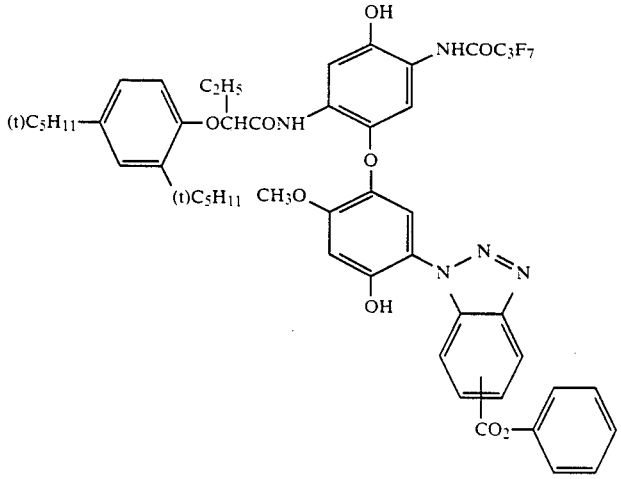
(5)
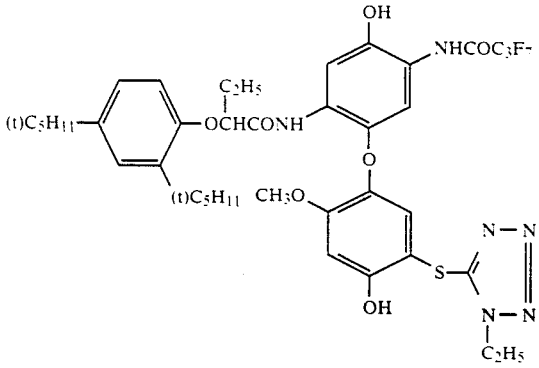

-continued
(6)
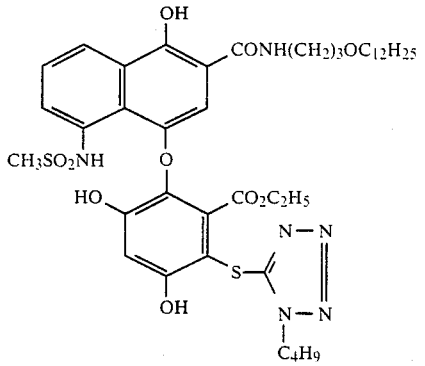
(7)
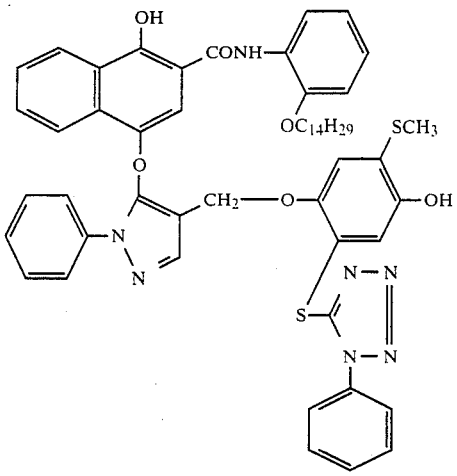
(8)
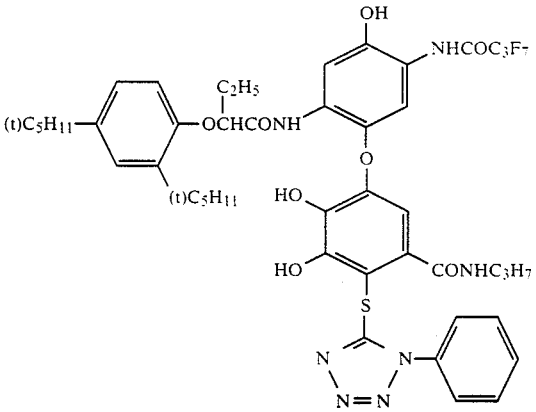

-continued
(9)
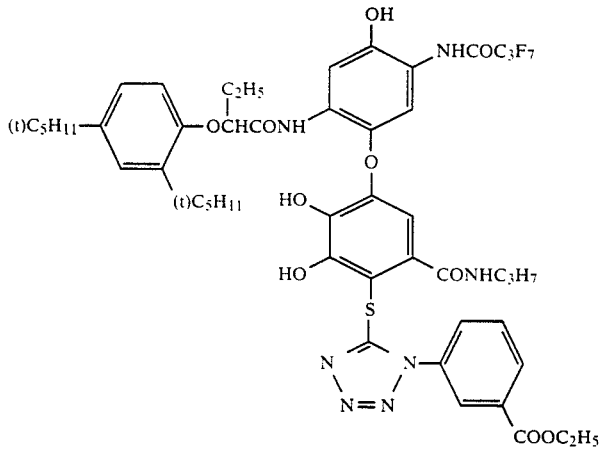
(10)
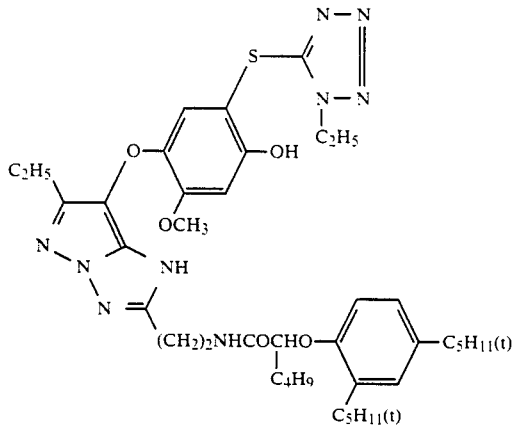
(11)
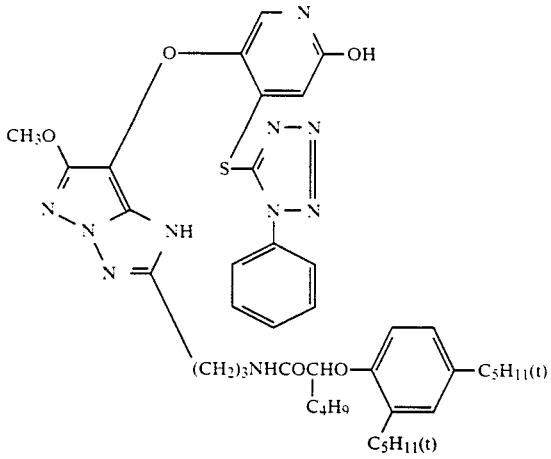

-continued
(12)
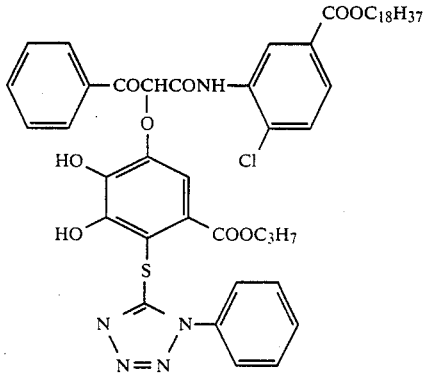
(13)
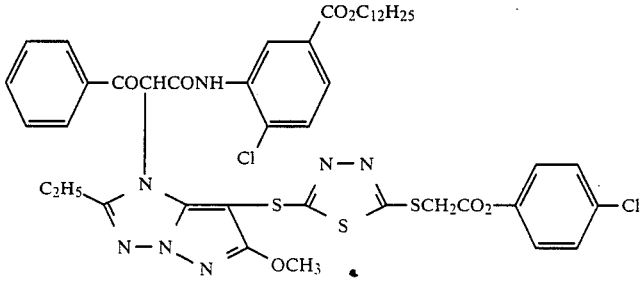
(14)
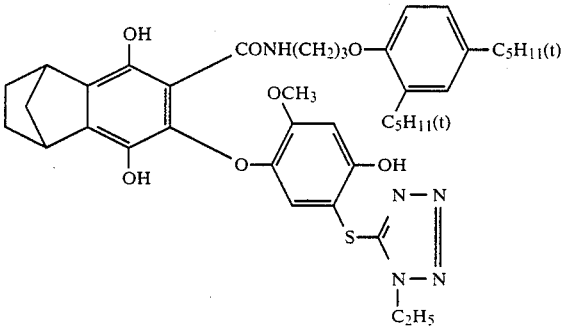
(15)
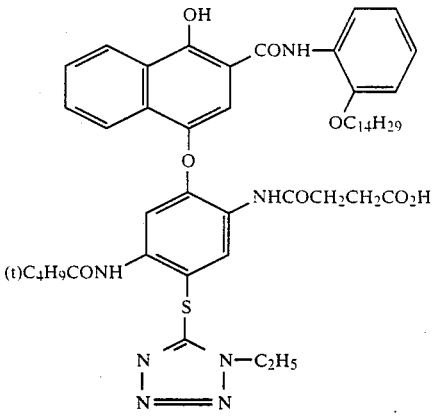

-continued
(16)
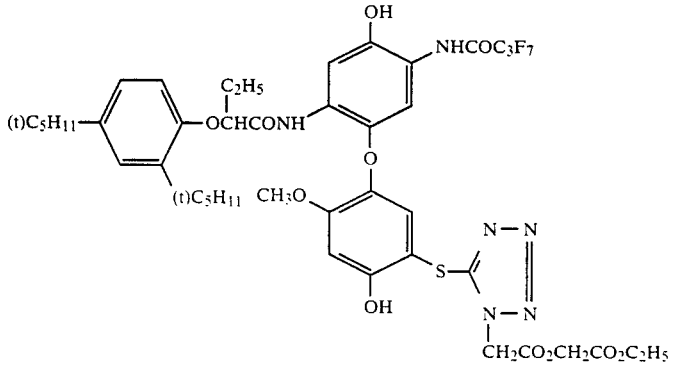
(17)
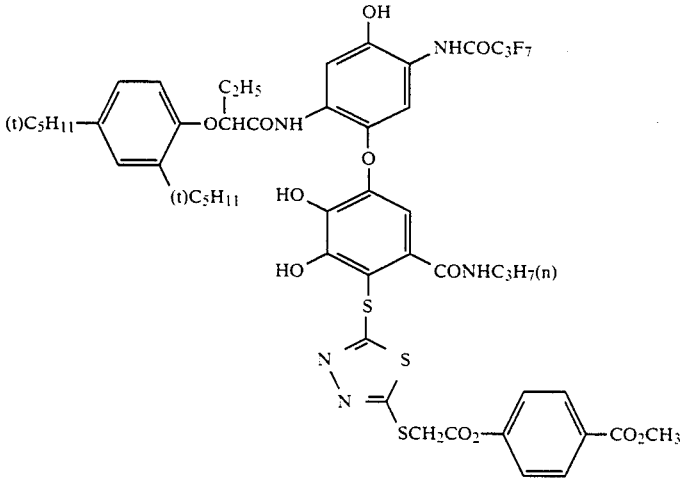
(18) to (35)
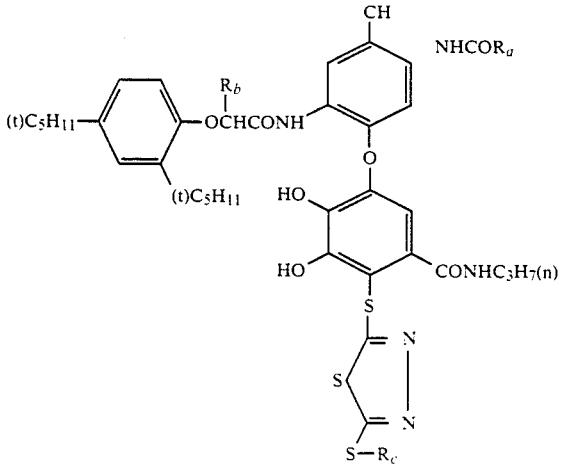
| Compound No. | $R_a$ | $R_b$ | $R_c$ |
|---|---|---|---|
| (18) | $-C_3F_7(n)$ | H | $-CH_2CH_2CO_2CH_3$ |
| (19) | " | $C_2H_5$ | " |
| (20) | $-CH_3$ | H | " |
| (21) | " | $C_2H_5$ | " |
| (22) | 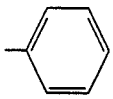 | H | " |
| (23) | " | $C_2H_5$ | " |
| (24) | $-(t)C_4H_9$ | H | " |
| (25) | " | $C_2H_5$ | " |
-continued
| Compound No. | $R_a$ | $R_b$ | $R_c$ |
|---|---|---|---|
| (26) | $-C_3F_7(n)$ | H | $-CH(CH_3)CO_2CH_3$ |
| (27) | " | $C_2H_5$ | " |
| (28) | $-CH_3$ | H | " |
| (29) | " | $C_2H_5$ | " |

-continued

| Compound No. | $R_a$ | $R_b$ | $R_c$ |
|---|---|---|---|
| (30) | 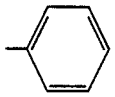 | H | " |
| (31) | " | $C_2H_5$ | " |
| (32) | -(t)$C_4H_9$ | H | " |
| (33) | " | $C_2H_5$ | " |
| (34) | $-C_3F_7$(n) | H | $-CH_2CO_2CH_3$ |
| (35) | $-C_3F_7$(n) | (n)$C_4H_9$ | " |

The couplers used in the present invention can be incorporated in the photographic material according to various known dispersion methods.

Examples of high boiling point organic solvents used for the oil-in-water dispersion method are described in U.S. Pat. No. 2,322,027, etc.

Steps for preparation and effects of latex dispersions and specific examples of latices for immersion are described in U.S. Pat. No. 4,199,363, West German Pat. Application (OLS) Nos. 2,541,274 and 2,541,230, etc.

Suitable supports which can be used in the present invention are disclosed in, for example, Research Disclosure, No, 17643, page 28, and *Research Disclosure, No.* 18716, page 647 right column to 648 left column (incorporated herein by reference).

The color photographic materials in accordance with the present invention can be developed and processed in a conventional manner, such as described in *Research Disclosure, No.* 17643, pages 28 and 29 and, *Research Disclosure, No.* 18716, page 651, left column to right column.

That is, color photographic materials of the present invention are imagewise exposed developed, bleach-fixed or fixed, and then rinsed with water or subjected to stabilizing processing.

At the rinsing step, it is common to save water by employing counter-current rinsing with two or more tanks. For the stabilizing processing, a representative example includes a multi-stage countercurrent stabilizing processing, as described in Japanese Pat. Application (OPI) No. 8543/82, instead of the rinsing step.

Hereafter, the present invention will be described by reference to the following examples, but is not deemed to be limited thereto. Unless otherwise indicated, all parts, percents, ratios and the like are by weight.

EXAMPLE 1

In order to evaluate effectiveness of the compounds (I) and (II) of the present invention, light-sensitive layers having compositions shown below were coated onto a cellulose triacetate film with a subbing layer in a multi-later construction, which was designated Sample 101.

(Preparation of Sample 101)

Coated amounts were expressed by g/m$^2$ unit of silver with respect to silver halide and colloidal silver, by g/m$^2$ unit with respect to photographic additives and gelatin, and by mols per 1 mol of silver halide in the same layer with respect to sensitizing dyes.

| First Layer (anti-halation layer) | |
|---|---|
| Black colloidal silver | 0.2 |
| Gelatin | 1.3 |
| UV absorbent UV-1 | 0.1 |

-continued

| | |
|---|---|
| UV absorbent UV-2 | 0.2 |
| Dispersion oil Oil-1 | 0.01 |
| Dispersion oil Oil-2 | 0.01 |

| Second Layer (intermediate layer) | |
|---|---|
| Silver bromide fine grains (mean grain diameter, 0.07 μm) | 0.15 |
| Gelatin | 1.0 |
| Colored coupler Cp-1 | 0.1 |
| Colored coupler Cp-2 | 0.01 |
| Dispersion oil Oil-1 | 0.1 |

| Third Layer (first red-sensitive emulsion layer) | |
|---|---|
| Silver iodobromide emulsion (silver iodide 4 mol %, mean grain diameter, 0.4 μm) | silver 2.0 |
| Gelatin | 1.8 |
| Sensitizing dye I | $1.1 \times 10^{-4}$ |
| Sensitizing dye II | $2.5 \times 10^{-5}$ |
| Sensitizing dye III | $3.5 \times 10^{-5}$ |
| Sensitizing dye IV | $2.2 \times 10^{-4}$ |
| Coupler Cp-3 | 0.80 |
| Coupler Cp-4 | 0.02 |
| Coupler Cp-2 | 0.003 |
| Dispersion oil Oil-1 | 0.03 |
| Dispersion oil Oil-3 | 0.012 |

| Fourth Layer (second red-sensitive emulsion layer) | |
|---|---|
| Silver iodobromide emulsion (silver iodide 7 mol %, mean grain diameter, 0.6 μm) | silver 1.5 |
| Gelatin | 1.0 |
| Sensitizing dye I | $6.5 \times 10^{-5}$ |
| Sensitizing dye II | $2.0 \times 10^{-5}$ |
| Sensitizing dye III | $2.5 \times 10^{-4}$ |
| Sensitizing dye IV | $2.5 \times 10^{-5}$ |
| Coupler Cp-5 | 0.05 |
| Coupler Cp-6 | 0.016 |
| Coupler Cp-2 | 0.01 |
| Dispersion oil Oil-1 | 0.01 |
| Dispersion oil Oil-2 | 0.05 |

| Fifth Layer (intermediate layer) | |
|---|---|
| Gelatin | 1.0 |
| Compound Cpd-A | 0.03 |
| Dispersion oil Oil-1 | 0.05 |
| Dispersion oil Oil-2 | 0.05 |

| Sixth Layer (first green-sensitive emulsion layer) | |
|---|---|
| Silver iodobromide emulsion (silver iodide 4 mol %, mean grain diameter, 0.4 μm) | silver 1.0 |
| Sensitizing dye V | $2.1 \times 10^{-4}$ |
| Sensitizing dye VI | $4.3 \times 10^{-4}$ |
| Gelatin | 1.1 |
| Coupler Cp-7 | 0.4 |
| Coupler Cp-4 | 0.06 |
| Coupler Cp-1 | 0.15 |
| Dispersion oil Oil-1 | 0.5 |

| Seventh Layer (second green-sensitive emulsion layer) | |
|---|---|
| Silver iodobromide emulsion (silver iodide 6 mol %, mean grain diameter, 0.7 μm) | silver 1.0 |
| Gelatin | 1.0 |
| Sensitizing dye V | $1.0 \times 10^{-4}$ |
| Sensitizing dye VI | $2.0 \times 10^{-4}$ |
| Coupler Cp-9 | 0.04 |
| Coupler Cp-10 | 0.08 |
| Coupler Cp-1 | 0.02 |
| Coupler Cp-8 | 0.02 |
| Dispersion oil Oil-1 | 0.10 |
| Dispersion oil Oil-2 | 0.05 |

| Eighth Layer (yellow filter layer) | |
|---|---|
| Gelatin | 1.2 |
| Yellow colloidal silver | 0.08 |
| Compound H-3 | 0.1 |

-continued

| | |
|---|---|
| Dispersion oil Oil-1 | 0.3 |
| **Ninth Layer (first blue-sensitive emulsion layer)** | |
| Monodispersed silver iodobromide emulsion (silver iodide 4 mol %, mean grain diameter, 0.4 μm) | silver 0.8 |
| Gelatin | 1.4 |
| Sensitizing dye III | $5 \times 10^{-4}$ |
| Coupler Cp-11 | 0.7 |
| Coupler Cp-4 | 0.07 |
| Dispersion oil Oil-1 | 0.25 |
| **Tenth Layer (second blue-sensitive emulsion layer)** | |
| Silver iodobromide emulsion (silver iodide 10 mol %, mean grain diameter, 1.0 μm) | silver 0.7 |
| Gelatin | 1.0 |
| Sensitizing dye VII | $2.5 \times 10^{-4}$ |
| Coupler Cp-11 | 0.25 |
| Dispersion oil Oil-1 | 0.07 |
| **Eleventh Layer (first protective layer)** | |

-continued

| | |
|---|---|
| Gelatin | 0.8 |
| UV absorbent UV-1 | 0.1 |
| UV absorbent UV-2 | 0.2 |
| Dispersion oil Oil-1 | 0.01 |
| Dispersion oil Oil-2 | 0.01 |
| **Twelfth Layer (second protective layer)** | |
| Silver bromide fine grains (mean grain diameter, 0.07 μm) | 0.5 |
| Gelatin | 0.45 |
| Polymethyl methacrylate particles (diameter of 1.5 μm) | 0.2 |
| Hardener K-1 | 0.4 |
| Formaldehyde scavenger S-1 | 1.0 |

In addition to the components described above, a surface active agent was incorporated in each layer as a coating aid.

Chemical structures or chemical names of the compounds used in the above example are shown below.

Cp-1

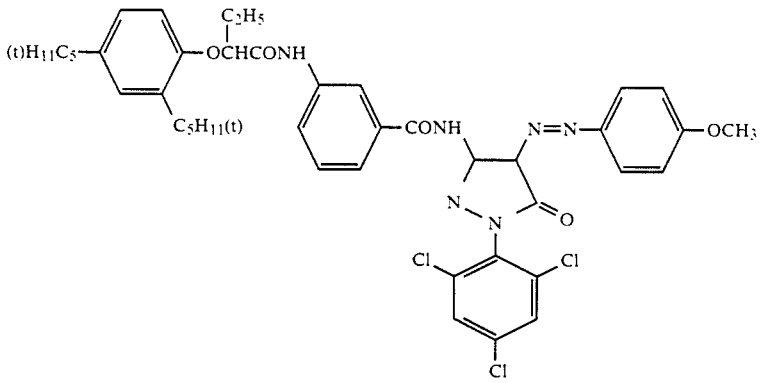

Cp-2

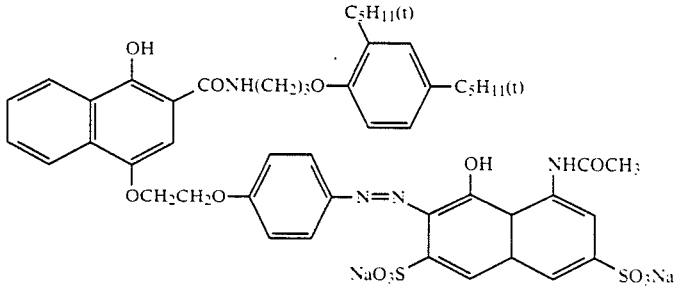

Cp-3

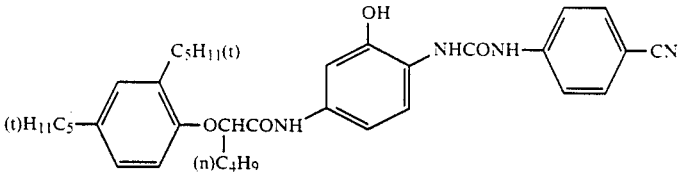

Cp-4

-continued
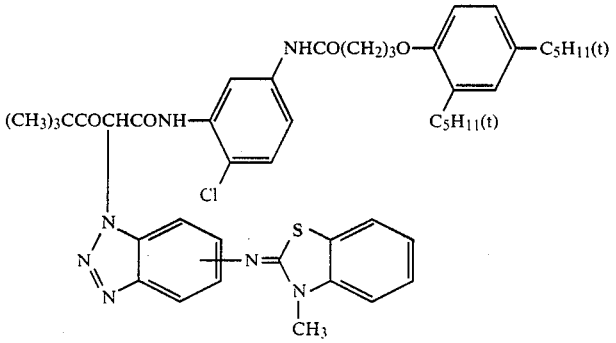
Cp-5
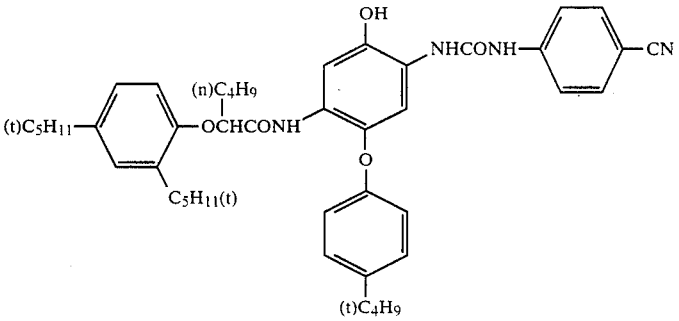
Cp-6
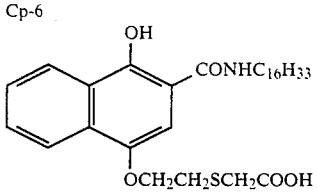
Cp-7
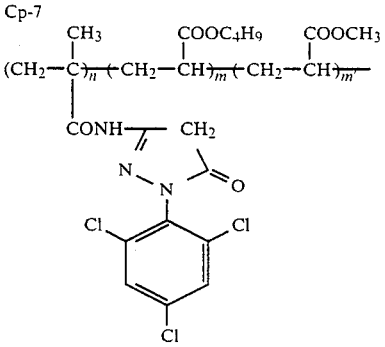
n/m + m' = 1 (by weight)
m/m' = 1 (by weight)
Molecular Weight: about 20.000
Cp-8
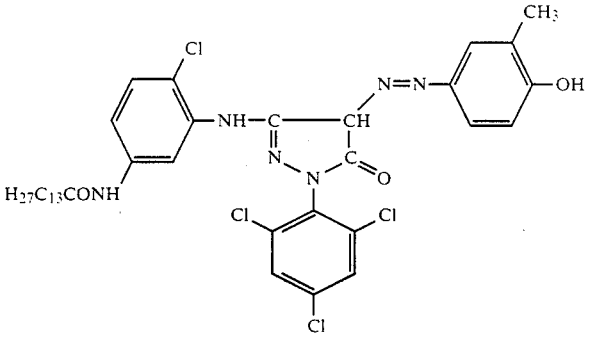

-continued
Cp-9
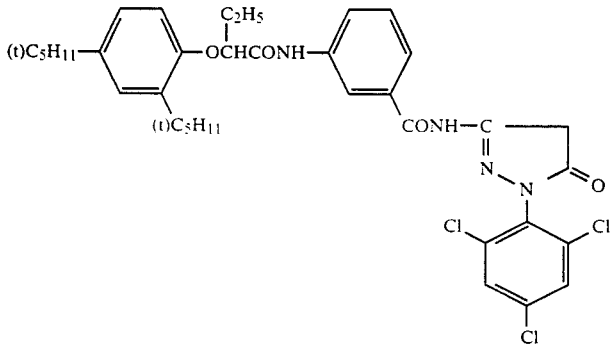
Cp-10
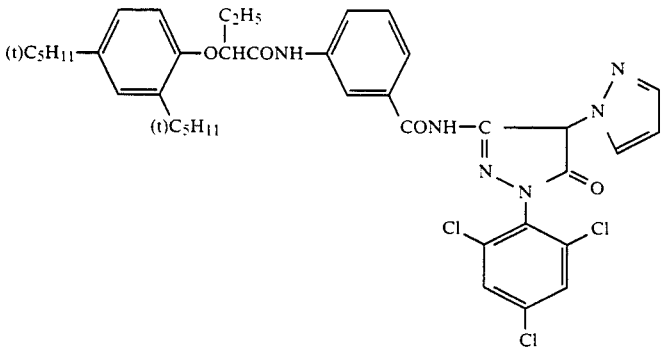
Cp-11
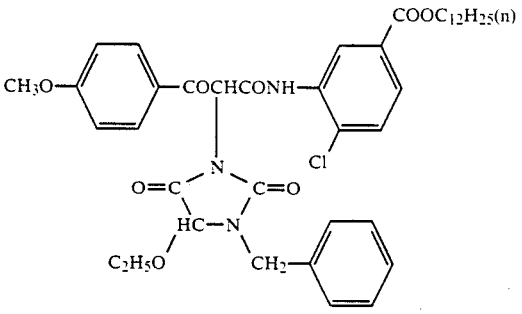
UV-1
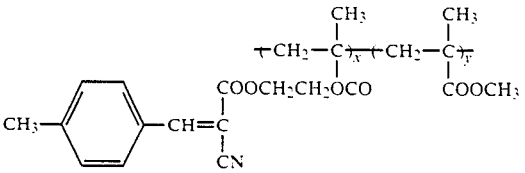
x/y = 7/3 (by weight)
UV-2
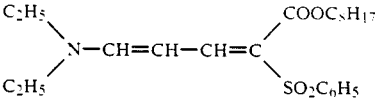
Oil-1 Tricresyl phosphate
Oil-2 Dibutyl phthalate
Oil-3 Bis(2-ethylhexyl)phthalate
Cpd A -continued

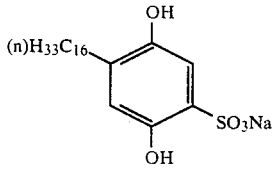

H-3

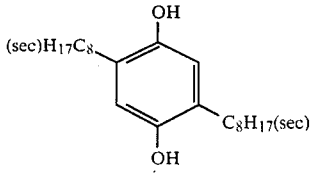

Sensitizing Dye I

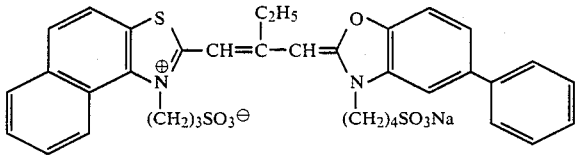

Sensitizing Dye II

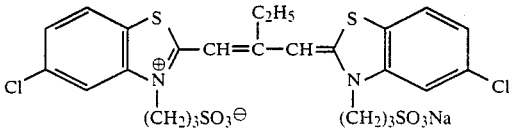

Sensitizing Dye III

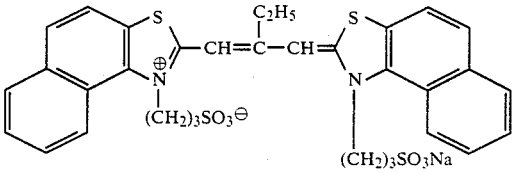

Sensitizing Dye IV

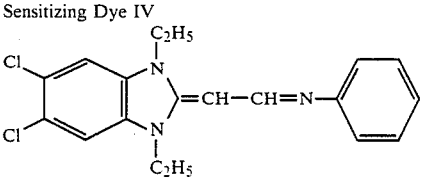

K-1

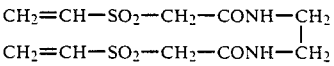

S-1

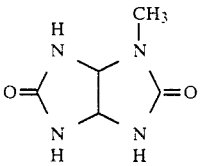

Development processing used herein was performed at 38° C. under the following conditions.

| | |
|---|---|
| 1. Color development | 2 mins. 45 seconds |
| 2. Bleaching | 6 mins. 30 seconds |
| 3. Rinsing | 3 mins. 15 seconds |
| 4. Fixing | 6 mins. 30 seconds |
| 5. Rinsing | 3 mins. 15 seconds |

-continued

| | |
|---|---|
| 6. Stabilizing | 3 mins. 15 seconds |

Compositions of processing solutions used at each step are described below.

| Color developer | |
|---|---|
| Sodium nitrilotriacetate | 1.0 g |
| Sodium sulfite | 4.0 g |
| Sodium carbonate | 30.0 g |
| Potassium bromide | 1.4 g |
| Hydroxylamine sulfate | 2.4 g |
| 4-(N-Ethyl-N-β-hydroxyethyl-amino)-2-methylaniline sulfate | 4.5 g |
| Water to make | 1 liter. |
| **Bleaching solution** | |
| Ammonium bromide | 160.0 g |
| Aqueous ammonia (28 wt %) | 25.0 ml |
| Ethylenediaminetetraacetic acid sodium iron salt | 130 g |
| Glacial acetic acid | 14 ml |
| Water to make | 1 liter. |
| **Fixing solution** | |
| Tetrasodium polyphosphate | 2.0 g |
| Sodium sulfite | 4.0 g |
| Ammonium thiosulfate (70%) | 175.0 ml |
| Sodium bisulfite | 4.6 g |
| Water to make | 1 liter. |
| **Stabilizing solution** | |
| Formalin | 8.0 ml |
| Water to make | 1 liter. |

(Preparation of Samples 102 and 103)

Samples 102 and 103 were prepared in a manner similar to the preparation of Sample 101 described above, except that Coupler Y-1 and Y-30 of the present invention were used, respectively, in place of Cp-11 in the ninth layer and the tenth layer.

Y-1 and Y-30 showed increased color densities by 1.3 times and 1.35 times, respectively, as compared to that of Cp-11, so that the amounts added were reduced to 76% and 74%, respectively. The amount of gelatin in the light-sensitive emulsion layers greatly affected physical properties of the gelatin layer; thus, in order to maintain the physical properties (especially strength of the layer) of the gelatin layer constant, the samples were prepared by maintaining a constant ratio of the amount of gelatin to the total amounts of couplers and high boiling point organic solvents (amounts of oil soluble components). As a result, the amounts of couplers and high boiling point organic solvents were reduced by the use of Y-1 and Y-30 of the present invention so that the amounts of gelatin were reduced to 1.06 g/m$^2$ in the ninth layer and to 0.80 g/m$^2$ in the tenth layer of Sample 102 and, to 1.04 g/m$^2$ in the ninth layer and to 0.75 g/m$^2$ in the tenth layer of Sample 103. Samples 102 and 103 were prepared in a similar manner to Sample 101 except that the amounts of the yellow coupler and gelatin were changed as indicated above.

(Preparation of Sample 104)

Sample 104 was prepared in a manner similar to Sample 101 except that Coupler Cp-7 in the sixth layer of Sample 101 was replaced by an equimolar amount of Coupler M-1 of the present invention.

(Preparation of Sample 105)

Sample 105 was prepared in a manner similar to Sample 101 except that Coupler Cp-7 in the sixth layer of Sample 101 was replaced by an equimolar amount of Coupler M-1 of the present invention and Couplers Cp-9 and Cp-10 in the seventh layer of Sample 101 were replaced by 0.10 g/m$^2$ of Coupler M-14 of the present invention.

(Preparation of Samples 106 and 107)

Samples 106 and 107 were prepared in a manner similar to Samples 102 and 103 except that Coupler Cp-7 in the sixth layer of Samples 102 and 103 was replaced by an equimolar amount of Coupler M-1 of the present invention.

(Preparation of Samples 108 and 109)

Samples 108 and 109 were prepared in a manner similar to Samples 102 and 103 except that Coupler Cp-7 in the sixth layer of Samples 102 and 103 was replaced by an equimolar amount of Coupler M-1 of the present invention, and Couplers Cp-9 and Cp-10 in the seventh layer of Samples 102 and 103 were replaced by 0.10 g/m$^2$ of Coupler M-14 of the present invention.

Samples 101 through 109 described above were exposed to white light through an imagewise wedge and then processed as described above to provide almost the same gradation.

Next, MTF (Modulation transfer function) values when exposed to blue light and to green light were measured. The method for measurement of MTF values is described in T. H. James, *The Theory of the Photographic Process*, 4th edition, published by MacMillan Publishing Co., Ltd., (1977), pages 604 to 607. MTF values of yellow dye images and magenta dye images obtained are shown in Table 1.

In order to evaluate color reproducibility, a ratio of the yellow dye image density to the magenta dye image density when the sample was imagewise exposed to green light was measured and a ratio of side absorption yellow density upon magenta color formation was used as a measure of color reproducibility as color turbidity. The results are shown in Table 1 below.

TABLE 1

| | Yellow coupler in 9th & 10th layer | Magenta coupler in 6th layer | Magenta coupler in 7th layer | MTF value of yellow dye images | MTF value of magenta dye images | Yellow density/magenta density when exposed to green light* |
|---|---|---|---|---|---|---|
| Sample 101 (Comp. Ex.) | Cp-11 (Comparative coupler) | Cp-7 (Comparative coupler) | Cp-9 Cp-10 (Comparative couplers) | 0.42 | 0.40 | 0.21 |
| Sample 102 (Comp. Ex.) | Y-1 (Coupler of this in- | Cp-7 (Comparative coupler) | Cp-9 Cp-10 (Comparative | 0.50 | 0.48 | 0.22 |

TABLE 1-continued

| | Yellow coupler in 9th & 10th layer | Magenta coupler in 6th layer | Magenta coupler in 7th layer | MTF value of yellow dye images | MTF value of magenta dye images | Yellow density/ magenta density when exposed to green light* |
|---|---|---|---|---|---|---|
| | vention) | | coupler) | | | |
| Sample 103 Comp. Ex.) | Y-30 (Coupler of this in-vention) | Cp-7 (Compar-ative coupler) | Cp-9 Cp-10 (Compar-ative coupler) | 0.51 | 0.49 | 0.22 |
| Sample 104 (Comp. Ex.) | Cp-11 (Compar-ative Example) | M-1 (Coupler of this in-vention) | Cp-9 Cp-10 (Compar-ative coupler) | 0.41 | 0.40 | 0.17 |
| Sample 105 (Comp. Ex.) | Cp-11 (Compar-ative Example) | M-1 (Coupler of this invention) | M-14 (Coupler of this invention) | 0.42 | 0.41 | 0.13 |
| Sample 106 (This invention) | Y-1 (Coupler of this invention) | M-1 (Coupler of this invention) | Cp-9 Cp-10 (Compar-ative coupler) | 0.51 | 0.47 | 0.15 |
| Sample 107 (This invention) | Y-30 (Coupler of this invention) | M-1 (Coupler of this invention) | Cp-9 Cp-10 (Compar-ative coupler) | 0.52 | 0.48 | 0.12 |
| Sample 108 (This invention) | Y-1 (Coupler of this invention) | M-1 (Coupler of this invention) | M-14 (Coupler of this invention) | 0.51 | 0.48 | 0.16 |
| Sample 109 (This invention) | Y-30 (Coupler of this invention) | M-1 (Coupler of this invention) | M-14 (Coupler of this invention) | 0.52 | 0.49 | 0.12 |

*Ratio of side absorption yellow density to magenta density in an exposure amount of magenta density being 2.2 when exposed to the decomposed green light.

From the results shown in Table 1, it is clearly understood that the photographic materials of the present invention employing a combination of couplers of formulae (I) and (II) provide unexpectedly superior photographic characteristics, particularly with respect to sharpness and color reproducibility.

EXAMPLE 2

(Preparation of Samples 201 to 205)

Samples 201 to 205 were prepared in the same manner as described for Sample 106 except that the cyan coupler, Coupler Cp-3 in the third layer was replaced by an equimolar amount of Couplers (a-1), (a-4), (a-13), (a-14) and (a-28), respectively.

(Preparation of Samples 206 to 208)

Samples 206 to 208 were prepared in the same manner as described for Sample 106 except that Coupler Cp-6 in the fourth layer was replaced by an equimolar amount of Couplers (a-6), (a-9), and (a-32), respectively.

Samples 201 through 208 described above were exposed and processed in the same manner as described in Example 1 to provide almost the same gradation.

Next, MTF values when exposed to green light and to red light were measured in the same manner as described in Example 1.

The results are shown in Table 2.

TABLE 2

| Sample No. | Remarks | Cyan coupler in 3rd layer | Cyan coupler in 4th layer | MTF value of cyan dye image | MTF value of magenta dye image |
|---|---|---|---|---|---|
| 106 | Present invention | Cp-3 | Cp-5 Cp-6 | 0.36 | 0.47 |
| 201 | Present invention | a-1 | Cp-5 Cp-6 | 0.35 | 0.48 |
| 202 | Present invention | a-4 | Cp-5 Cp-6 | 0.37 | 0.46 |
| 203 | Present invention | a-13 | Cp-5 Cp-6 | 0.36 | 0.47 |
| 204 | Present invention | a-14 | Cp-5 Cp-6 | 0.35 | 0.45 |
| 205 | Present invention | a-28 | Cp-5 Cp-6 | 0.35 | 0.48 |
| 206 | Present invention | Cp-3 | Cp-5 a-6 | 0.36 | 0.48 |
| 207 | Present invention | " | Cp-5 a-9 | 0.37 | 0.46 |
| 208 | Present invention | " | Cp-5 a-32 | 0.35 | 0.45 |

EXAMPLE 3

(Preparation of Samples 301 to 303)

Sample 301 to 303 were prepared in the same manner as described for Sample 106 except that the DIR coupler, Coupler Cp-4 in the third layer was replaced by 33% by mol of Couplers (8), (19) and (26), respectively, and Coupler Cp-3 in the third layer was reduced to 90% by mol.

These samples were exposed and processed in the same manner as described in Example 1 to provide almost the same gradation.

Next, MTF values when exposed to green light were measured in the same manner as described in Example 1.

The results are shown in Table 3.

TABLE 3

| Sample No. | Remarks | DIR Coupler in 4th layer | MTF value of magenta dye image |
|---|---|---|---|
| 106 | Present invention | Cp-2 | 0.47 |
| 301 | Present invention | (8) | 0.45 |
| 302 | Present invention | (19) | 0.46 |
| 303 | Present invention | (26) | 0.46 |

From the results shown in Tables 2 and 3, it is clearly understood that the photographic materials of the present invention are excellent in sharpness.

While the invention has been described in detail and with reference to specific embodiments thereof, it will be apparent to one skilled in the art that various changes and modifications can be made therein without departing from the spirit and scope thereof.

What is claimed is:

1. A silver halide color photographic material comprising a support having thereon at least one sliver halide emulsion layer, wherein the photographic material contains at least one compound represented by general formula (1) and at least one compound represented by general formula (11) in combination:

$$\text{Cp}-(\text{TIME})_n-\text{X}-\text{Dye} \qquad \text{(I)}$$

wherein Cp represents a coupler residue capable of releasing —(TIME)$_n$—X—Dye upon coupling with an oxidation product of an aromatic primary amine developing agent; TIME represents a timing group; n represents 0 or a positive integer; Dye represents a non-diffusible dye residue, and X represents an auxochromic group of said dye;

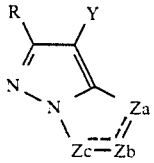

(II)

wherein R represents a hydrogen atom or a substituent; Y represents a hydrogen atom or a coupling-off group; Za, Zb and Zc each represents a methine group, a substituted methine group, —N— or —NH—; either the Za—Zb bond or the Zb—Zc bond represents a double bond and the other represents a single bond, provided that when Za, Zb or Zc represents a substituted methine group, one of the substituted methine group or R may be a divalent group capable of linking to form a dimer or higher polymer, and provided that Y does not represent —(TIME)$_n$—X—Dye as defined in general formula (I), wherein X-Dye moiety of general formula (I) is represented by general formula (III):

$$-\text{X}-\text{W}_1-\text{N}=\text{N}-\text{W}_2 \qquad \text{(III)}$$

wherein X has the same meaning as defined in general formula (I); $W_1$ represents an atomic group which contains at least one unsaturated bond in conjugation with the azo group and connects with X on an atom forming the unsaturated bond; $W_2$ represents an atomic group which contains at least one unsaturated bond capable of conjugating with the azo group; and $W_1$ and $W_2$ contain a total of at least 10 carbon atoms, wherein said X is an oxygen atom or a sulfur atom, and wherein said photographic material further comprises a phenol type coupler containing a phenylureido group in the 2-position and an acylamino group in the 5-position.

2. A silver halide color photographic material as claimed in claim 1, wherein $W_1$ represents an aromatic group selected from the group consisting of a substituted or unsubstituted phenyl group and substituted or unsubstituted naphthyl group.

3. A silver halide color photographic material as claimed in claim 1, wherein $W_2$ represents an unsubstituted 4-membered to 7-membered heterocyclic group containing a hetero atom selected from the group consisting of a nitrogen atom, a sulfur atom and an oxygen atom.

4. A silver halide color photographic material as claimed in claim 1, wherein $C_p$ is a coupler residue represented by general formulae (IV), (V), (VI), (VII), (VIII), (IX) and (X):

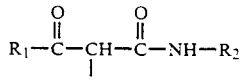
(IV)

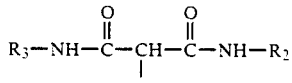
(V)

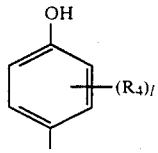
(VI)

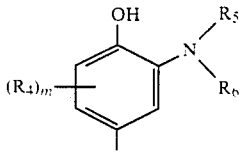
(VII)

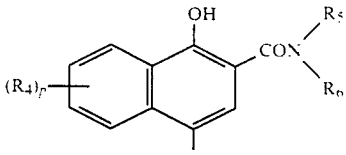
(VIII)

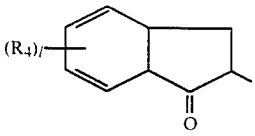
(IX)

-continued $$R_7-\underset{|}{CH}-R_8 \qquad (X)$$

wherein $R_1$ represents an aliphatic group, an aromatic group, an alkoxy group or a heterocyclic group; $R_2$ and $R_3$, which may be the same or different, each represents an aromatic group or a heterocyclic group; $R_4$ represents a hydrogen atom, a halogen atom, an alkoxycarbonylamino group, an aliphatic hydrocarbon residue, an N-arylureido group, an acylamino group, —O—$R_9$ or —S—$R_9$ wherein $R_9$ is an aliphatic hydrocarbon residue; in case that two or more $R_4$s are present in the same molecule, $R_4$s may be different from each other and the aliphatic hydrocarbon residue may be substituted thereon; $R_5$ and $R_6$ each represents a hydrogen atom, an aliphatic hydrocarbon residue, an aryl group and a heterocyclic group, provided that $R_5$ and $R_6$ are not a hydrogen atom simultaneously; and $R_5$ and $R_6$ may combine together to form a nitrogen-containing heterocyclic nucleus; $R_7$ represents an arylcarbonyl group, an alkanoyl group having 2 to 32 carbon atoms, an arylcarbamoyl group, an alkylcarbamoyl group having 2 to 32 carbon atoms, an alkoxycarbonyl group having 1 to 32 carbon atoms, or an aryloxycarbonyl group, and these which groups for $R_7$ may also be substituted with an alkoxy group, an alkoxycarbonyl group, an acylamino group, an alkylsulfamoyl group, an alkylsulfonamido group, an alkylsuccinimido group, a halogen atom, a nitro group, a carboxyl group, a nitrile group, an alkyl group or an aryl group; $R_8$ represents an arylcarbonyl group, an alkanoyl group having 2 to 32 carbon atoms, an arylcarbamoyl group, an alkylcarbamoyl group having 2 to 32 carbon atoms, an alkoxycarbonyl group having 1 to 32 carbon atoms, an aryloxycarbonyl group, an alkylsulfonyl group having 1 to 32 carbon atoms, an arylsulfonyl group, an aryl group, a 5-membered or 6-membered heterocyclic group containing a nitrogen atom, an oxygen atom or a sulfur atom; represents an integer of 1 to 4; m represents an integer of 1 or 3; and p represents an integer of 1 to 5.

5. A silver halide color photographic material as claimed in claim 1, wherein said coupler represented by general formula (I) is a polymer containing at least one monomer coupler represented by general formula (Xl) and having a repeating unit represented by general formula (XII) or a copolymer there of with at least one non-color forming monomer containing at least one ethylene group which is incapable of coupling with the oxidation product of an aromatic primary amine developing agent:

$$CH_2=\overset{R_{10}}{\overset{|}{C}}\text{-}(A_2)_j\text{-}(A_3)_j\text{-}(A_1)_k\text{-}Q \qquad (XI)$$

$$(CH_2-\overset{R_{10}}{\overset{|}{C}})_{\overset{|}{(A_2)_j\text{-}(A_3)_j\text{-}(A_1)_k\text{-}Q}} \qquad (XII)$$

wherein $R_{10}$ represents a hydrogen atom, a lower alkyl group having 1 to 4 carbon atoms, or a chlorine atom; $A_1$ represents —CONH—, —HCONH—, —NHCOO—, —COO—, —$SO_2$—, —CO—, —NHCO—, —$SO_2$NH—, —NH$SO_2$—, —OCO—, —OCONH—, —NH— or —O—; $A_2$ represents —CONH— or —COO—; and $A_3$ represents an unsubstituted or substituted alkylene group having 1 to 10 carbon atoms, an unsubstituted or substituted aralkylene group or an unsubstituted or substituted arylene group; Q represents a residue represented by general formula (I) which may be bonded at any position on Cp, TIME and Dye in said formula (I); and i, j and k each represents 0 or 1, with the proviso that i, j and k are not 0 simultaneously.

6. A silver halide color photographic material as claimed in claim 1, wherein said compound represented by general formula (II) is represented by general formulae (XIII), (XIV), (XV), (XVI) and (XVII):

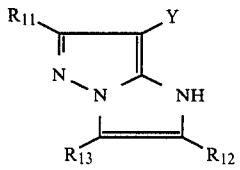
(XIII)

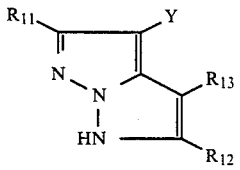
(XIV)

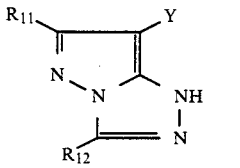
(XV)

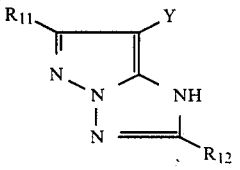
(XVI)

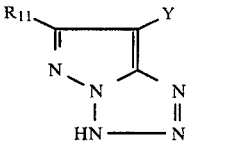
(XVII)

wherein $R_{11}$, $R_{12}$ and $R_{13}$, which may be the same or different, each represents a hydrogen atom, a halogen atom, an alkyl group, an aryl group, a heterocyclic group, a cyano group, an alkoxy group, an aryloxy group, a heterocyclic oxy group, an acyloxy group, a carbamoyloxy group, a silyloxy group, a sulfonyloxy group, an acylamino group, an anilino group, a ureido group, an imido group, a sulfamoylamino group, a carbamoylamino group, an alkylthio group, an arylthio group, a heterocyclic thio group, an alkoxycarbonylamino group, an aryloxycarbonylamino group, a sulfonamide group, a carbamoyl group, an acyl group, a sulfamoyl group, a sulfonyl group, a sulfinyl group, an alkoxycarbonyl group, an aryloxycarbonyl group, etc.; y represents a hydrogen atom, an arylthio group, or an aryloxy group; $R_{11}$, $R_{12}$, $R_{13}$ or Y may also be a divalent group capable of linking to form a dimer or higher polymer or $R_{12}$ and $R_{13}$ of general formula (XII) may be combined together to form a benzene ring.

7. A silver halide color photographic material as claimed in claim 1, wherein said moiety of general formula (III)is selected from the following formulae (D-1) to (D-6):

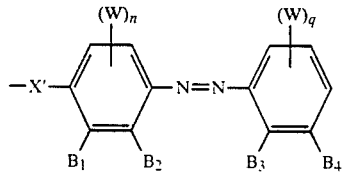
(D-1)

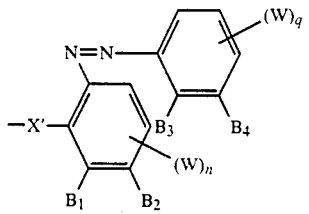
(D-2)

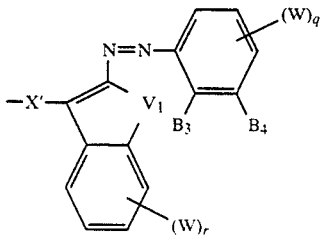
(D-3)

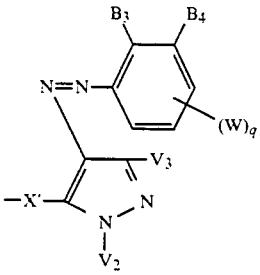
(D-4)

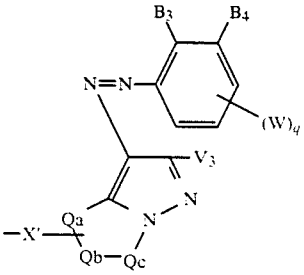
(D-5)

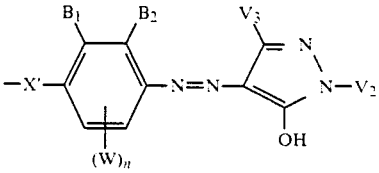
(D-6)

wherein X, represents an oxygen atom or a sulfur atom; W represents a substituent selected from those exemplified as substituents for $W_1$ and $W_2$ in general formula (III); n represents 0, 1 or 2; q represents 0, 1, 2 or 3; and r represents 0 or an integer of 1 to 4. $B_1$, $B_2$, $B_3$ and $B_4$, which may be the same or different, each represents a hydrogen atom or a substituent as defined for W; or, $B_1$ and $B_2$ or $B_3$ and $B_4$ may be combined to form a benzene condensed ring, and in this case, the benzene condensed ring may also be substituted with a substituent as defined for W.

8. A silver halide color photographic material as claimed in claim 1, wherein said compound of general formula (I) is present in an amount of from about 0.005 to about 2 g/m$^2$.

9. A silver halide color photographic material as claimed in claim 8, wherein said compound of general formula (I) is present in an amount of from 0.01 to 1 g/m$^2$.

10. A silver halide color photographic material as claimed in claim 1, wherein said compound of general formula (II) is present in an amount of from about 0.005 to about 2 g/m$^2$.

11. A silver halide color photographic material as claimed in claim 10, wherein said compound of general formula (II) is present in an amount of from about 0.01 to about 1 g/m$^2$.

12. A silver halide color photographic material comprising a support having thereon at least one silver halide emulsion layer, wherein the photographic material contains at least one compound represented by general formula (I) and at least one compound represented by general formula (II) in combination:

$$Cp—(TIME)_n—X—Dye \quad (I)$$

wherein Cp represents a coupler residue capable of releasing —(TIME)$_n$—X—Dye upon coupling with an oxidation product of an aromatic primary amine developing agent; TIME represents a non-diffusible timing group; n represents 0 or a positive integer; Dye represents a dye residue, and X represents an auxochromic group of said dye;

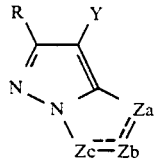
(II)

wherein R represents a hydrogen atom or a substituent, Y represents a hydrogen atom or a coupling-off group, Za, Zb and Zc each represents a methine group, a substituted methine group, =Nor— or —NH—; either the Za—Zb bond or the Zb—Zc bond represents a double bond and the other represents a single bond, provided that when Za, Zb or Zc represents a substituted methine group, one of the substituted methine group or R may be a divalent group capable of linking to for a dimer or higher polymer, and provided that Y does not represent —(TIME)$_n$—X—Dye as defined in general formula (1), wherein X-Dye moiety of general formula (I) is represented by general formula (I) is represented by general formula (III):

$$—Z—W_1—N=N—W_2 \quad (II)$$

wherein X has the same meaning as defined in general formula (I); $W_1$ represents an atomic group which contains at least one unsaturated bond in conjugation with the azo group and connects with X on an atom forming the unsaturated bond; $W_2$ represents an atomic group which contains at least one unsaturated bond capable of conjugating with the azo group; and $W_1$ and $W_2$ contain a total of at least 10 carbon atoms, wherein said X is an oxygen atom or a sulfur atom, and wherein said photographic material further comprises a naphthol type coupler containing an amido group in the 5-position.

13. A silver halide color photographic material comprising a support having thereon at least one silver halide emulsion layer, wherein the photographic material contains at least one compound represented by general formula (I) and at least one compound represented by general formula (II) in combination:

$$Cp—(TIME)_n—X—Dye \quad (I)$$

wherein Cp represents a coupler residue capable of releasing —(TIME)$_n$—X—Dye upon coupling with an oxidation product of an aromatic primary amine developing agent; TIME represents a timing group; n represents 0 or a positive integer; Dye represents a non-diffusible dye residue, and X represents an auxochromic group of said dye;

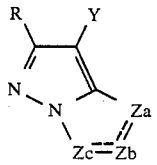

(II)

wherein R represents a hydrogen atom or a substituent, Y represents a hydrogen atom or a coupling-off group, Za, Zb and Zc each represents a methine group, a substituted methine group, =N— or —NH—; either the Za—Zb bond or the Zb—Zc bond represents a double bond and the other represents a single bond, provided that when Za, Zb or Zc represents a substituted methine group, one of the substituted methine group or R may be a divalent group capable of linking to form a dimer or higher polymer, and provided that Y does not represent —(TIME)$_n$—X—Dye as defined in general formula (I), wherein X-Dye moiety of general formula (I) is represented by general formula (III):

$$—X—W_1—N=N—W_2 \quad (III)$$

wherein X has the same meaning as defined in general formula (I); $W_1$ represents an atomic group which contains at least one unsaturated bond in conjugation with the azo group and connects with X on an atom forming the unsaturated bond; $W_2$ represents an atomic group which contains at least one unsaturated bond capable of conjugating with the azo group; and $W_1$ and $W_2$ contain a total of at least 10 carbon atoms, wherein said X is an oxygen atom or a sulfur atom, said photographic material further comprises a naphthol type coupler containing a carbamoyl group in the 2-position.

14. A silver halide color photographic material comprising a support having thereon at least one silver halide emulsion layer, wherein the photographic material contains at least one compound represented by general formula (I) and at least one compound represented by general formula (II) in combination:

$$Cp—(TIME)_n—X—Dye \quad (I)$$

wherein Cp represents a coupler residue capable of releasing —(TIME)$_n$—X—Dye upon coupling with an oxidation product of an aromatic primary amine developing agent; TIME represents a timing group; n represents 0 or a positive integer; Dye represents a non-diffusible dye residue, and X represents an auxochromic group of said dye;

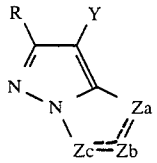

(II)

wherein R represents a hydrogen atom or a substituent, Y represents a hydrogen atom or a coupling-off group, Za, Zb and Zc each represents a methine group, a substituted methine group, =N— or —NH—; either the Za—Zb bond or the Zb—Zc bond represents a double bond and the other represents a single bond, provided that when Za, Zb or Zc represents a substituted methine group, one of the substituted methine group or R may be a divalent group capable of linking to form a dimer or higher polymer, and provided that Y does not represent —(TIME)$_n$—X—Dye as defined in general formula (I), wherein X-Dye society of general formula (I) is represented by general formula (III):

$$—X—W_1—N=N—W_2 \quad (III)$$

wherein X has the same meaning as defined in general formula (I); $W_1$ represents an atomic group which contains at least one unsaturated bond in conjugation with the azo group and connects with X on an atom forming the unsaturated bond; $W_2$ represents an atomic group which contains at least one unsaturated bond capable of conjugating with the azo group; and $W_1$ and $W_2$ contain a total of at least 10 carbon atoms, wherein said X is an oxygen atom or a sulfur atom, and wherein said material further contains a coupler represented by general formula (XVIII):

$$A—RED—PUG \quad (XVIII)$$

wherein A represents a coupler residue which releases the RED—PUG group upon the coupling reaction with the oxidation product of a developing agent; RED represents a group which releases the FUG group after the oxidation-reduction reaction with the oxidation product of a developing agent after the bonding to A is cleaved selected from the group consisting of a hydroquinone, a catechol, a naphthohydroquinone, an o-amino or p-amino phenol or a bisphenol; and PUG represents a group which exerts a substantial photographic function after the bonding the RED is cleaved.

* * * * *